United States Patent
Krone et al.

(10) Patent No.: US 11,745,552 B2
(45) Date of Patent: Sep. 5, 2023

(54) SYSTEM FOR DETECTING FAILURE OF AN ARTICULATED STEERING MECHANISM

(71) Applicant: Caterpillar Inc., Peoria, IL (US)

(72) Inventors: John James Krone, Peoria, IL (US); Daniel Peter Sergison, East Peoria, IL (US); Edward William Mate, Manhattan, IL (US); Jeremy T. Peterson, Washington, IL (US); Bradly Glen Duffer, East Peoria, IL (US); Matthew Stephen Marquette, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 248 days.

(21) Appl. No.: 17/180,269

(22) Filed: Feb. 19, 2021

(65) Prior Publication Data
US 2022/0266642 A1    Aug. 25, 2022

(51) Int. Cl.
*B60D 1/24* (2006.01)
*B60D 1/30* (2006.01)
(Continued)

(52) U.S. Cl.
CPC ............... *B60D 1/246* (2013.01); *B60D 1/30* (2013.01); *B60D 1/62* (2013.01); *B62D 13/005* (2013.01)

(58) Field of Classification Search
CPC .......... B60D 1/246; B60D 1/249; B60D 1/30; B60D 1/62; B62D 5/12; B62D 5/28;
(Continued)

(56) References Cited

U.S. PATENT DOCUMENTS

| 5,725,063 A | * | 3/1998 | Ceragioli | B62D 12/00 180/14.4 |
| 5,908,081 A | * | 6/1999 | Olson | B62D 9/00 180/419 |

(Continued)

FOREIGN PATENT DOCUMENTS

| CN | 105480299 A | * | 4/2016 |
| CN | 106926898 A | | 7/2017 |

(Continued)

OTHER PUBLICATIONS

Written Opinion and International Search Report for Int'l. Patent Appln. No. PCT/US2022/016088, dated May 3, 2022 (12 pgs).

(Continued)

*Primary Examiner* — Minnah L Seoh
*Assistant Examiner* — Maurice L Williams

(57) ABSTRACT

A machine includes a frame and an oscillating hitch. A first cylinder couples to a first side of the oscillating hitch and a first side of the frame. A second cylinder couples to a second side of the oscillating hitch and a second side of the frame. A first isolating mechanism couples to the first cylinder and rotates in response to a first rotation of the first cylinder relative to the frame or the oscillating hitch. A first angle sensor senses a first angular displacement of the first isolating mechanism about a first rotational axis. A second isolating mechanism couples to the second cylinder and rotates in response to a second rotation of the second cylinder relative to the frame or the oscillating hitch. A second angle sensor senses a second angular displacement of the second isolating mechanism about a second rotational axis.

17 Claims, 6 Drawing Sheets

(51) Int. Cl.
 *B62D 13/00* (2006.01)
 *B60D 1/62* (2006.01)
(58) Field of Classification Search
 CPC ........ B62D 12/00; B62D 12/02; B62D 13/00; B62D 13/005; B62D 13/02; B62D 15/0225; B62D 15/021
 See application file for complete search history.

(56) References Cited

U.S. PATENT DOCUMENTS

| | | | |
|---|---|---|---|
| 6,039,133 | A | 3/2000 | Zulu |
| 6,047,229 | A | 4/2000 | Ishikawa |
| 6,293,022 | B1 | 9/2001 | Chino et al. |
| 6,848,254 | B2 * | 2/2005 | Du .................. F03C 1/0697 60/452 |
| 7,896,125 | B2 * | 3/2011 | Ivantysynova ........ B62D 12/00 180/419 |
| 8,825,295 | B2 | 9/2014 | Turner |
| 9,272,729 | B2 | 3/2016 | Minoshima et al. |
| 10,266,200 | B2 | 4/2019 | Takenaka et al. |
| 10,654,522 | B2 | 5/2020 | Carter |
| 10,865,543 | B2 * | 12/2020 | Takenaka ................. B62D 5/09 |
| 2005/0092540 | A1 * | 5/2005 | Saarinen ................ B62D 12/00 180/418 |
| 2007/0001416 | A1 | 1/2007 | Freytag |
| 2012/0317846 | A1 * | 12/2012 | Audet .................. B62D 12/00 180/9.1 |
| 2013/0039729 | A1 * | 2/2013 | Landoll ............... B66F 9/07568 414/642 |
| 2014/0367189 | A1 | 12/2014 | Minoshima |
| 2018/0170369 | A1 | 6/2018 | Mitchell et al. |
| 2020/0025550 | A1 * | 1/2020 | Utermoehlen ........... G01B 7/30 |
| 2020/0055544 | A1 | 2/2020 | Veasy et al. |
| 2020/0223476 | A1 | 7/2020 | Mate et al. |
| 2022/0266905 | A1 * | 8/2022 | Krone ..................... B62D 7/18 |

FOREIGN PATENT DOCUMENTS

| | | |
|---|---|---|
| CN | 105857393 B | 11/2017 |
| CN | 109625080 | 7/2020 |
| CN | 111483522 | 8/2020 |
| DE | 10103404 A1 | 8/2002 |
| EP | 2840012 B1 | 2/2015 |

OTHER PUBLICATIONS

Written Opinion and International Search Report for Int'l. Patent Appln. No. PCT/US2022/016252, dated May 20, 2022 (13 pgs).

* cited by examiner

SYSTEM FOR DETECTING FAILURE OF AN ARTICULATED STEERING MECHANISM

TECHNICAL FIELD

The present disclosure relates to systems for measuring steering angles of a machine. More specifically, the present disclosure relates to a system for measuring steering angles for use in determining a failure of a steering assembly of the machine.

BACKGROUND

Machines, such as mining trucks, loaders, dozers, or other construction and mining equipment, are frequently used for building, construction, mining, and other activities. For example, mining trucks are often used for hauling mined materials from mining sites. These machines have steering assemblies that may include tie rods, arms, hydraulic cylinders, mechanical linkages, and so forth. While steering assemblies are designed to avoid failure, in heavy-duty applications, long service wear, lack of maintenance, and/or abusive usage may cause failures.

To detect faults, the steering assemblies, or components thereof, may include sensors. In some instances, the sensors may measure steering angles of the machine to determine whether the steering angles are within certain ranges. Steering angles that are outside of the ranges may indicate failure. However, conventionally, sensors are located internal to components of the steering assembly, such as the hydraulic cylinders. The location of the sensors makes replacement of the sensors and/or hydraulic cylinders difficult as well as time consuming. Additionally, sensors located within the hydraulic cylinders increases manufacturing and repair costs.

One mechanism for measuring a steering angle is described in U.S. Pat. No. 10,266,200 (hereinafter referred to as "the '200 reference"). The '200 reference describes steering cylinders with cylinder stroke sensors for detecting the stroke of the cylinders, respectively. Sensed values from these cylinder stroke sensors may be used to find the steering angles. However, the cylinder stroke sensors described in the '200 reference are integral to the steering cylinders. This increases effort and downtime when repairing the sensors, and/or requires replacement of the entire steering cylinder.

Examples of the present disclosure are directed toward overcoming one or more of the deficiencies noted above.

SUMMARY

According to a first aspect, a machine may include a frame, an oscillating hitch configured to pivot relative to the frame, a first cylinder coupled to a first side of the oscillating hitch and a first side of the frame, and a second cylinder coupled to a second side of the oscillating hitch and a second side of the frame. The machine may further include a first isolating mechanism coupled to the first cylinder and configured to rotate in response to a first rotation of the first cylinder relative to at least one of the frame or the oscillating hitch and a first angle sensor configured to sense a first angular displacement of the first isolating mechanism about a first rotational axis. The machine may further include a second isolating mechanism coupled to the second cylinder and configured to rotate in response to a second rotation of the second cylinder relative to at least one of the frame or the oscillating hitch; and a second angle sensor configured to sense a second angular displacement of the second isolating mechanism about a second rotational axis.

According to a further aspect, a machine may include a hitch and a steering assembly including a first hydraulic actuator and a second hydraulic actuator. The machine may further include a first isolating mechanism coupled to the first hydraulic actuator and configured to rotate in response to a first rotation of the first hydraulic actuator and a first sensor configured to sense a first angular displacement of the first isolating mechanism about a first rotational axis. The machine may further include a second isolating mechanism coupled to the second hydraulic actuator and configured to rotate in response to a second rotation of the second hydraulic actuator and a second sensor configured to sense a second angular displacement of the second isolating mechanism about a second rotational axis.

According to a further aspect, a machine may include a frame, an oscillating hitch configured to pivot relative to the frame, a first cylinder extending between the oscillating hitch and the frame, the first cylinder being coupled to the frame to pivot relative to the frame about a first axis, and a second cylinder extending between the oscillating hitch and the frame, the second cylinder being coupled to the frame to pivot relative to the frame about a second axis. The machine may further include a first isolating mechanism contacting an outer surface of the first cylinder and configured to isolate first rotation of the first cylinder about the first axis from movements other than the first rotation of the first cylinder and a first angle sensor configured to sense a first angular displacement of the first isolating mechanism about the first axis. The machine may further include a second isolating mechanism contacting an outer surface of the second cylinder and configured to isolate second rotation of the second cylinder about the second axis from movements other than the second rotation of the second cylinder and a second angle sensor configured to sense a second angular displacement of the second isolating mechanism about the second axis.

BRIEF DESCRIPTION OF THE FIGURES

The present disclosure is set forth with reference to the accompanying figures. In the figures, the left-most digit(s) of a reference number identifies the figure in which the reference number first appears. The use of the same reference numbers in different figures indicates similar or identical items. Furthermore, the figures may be considered as providing an approximate depiction of the relative sizes of the individual components within individual figures. However, the representations within the figures are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

DETAILED DESCRIPTION

Figure 1:
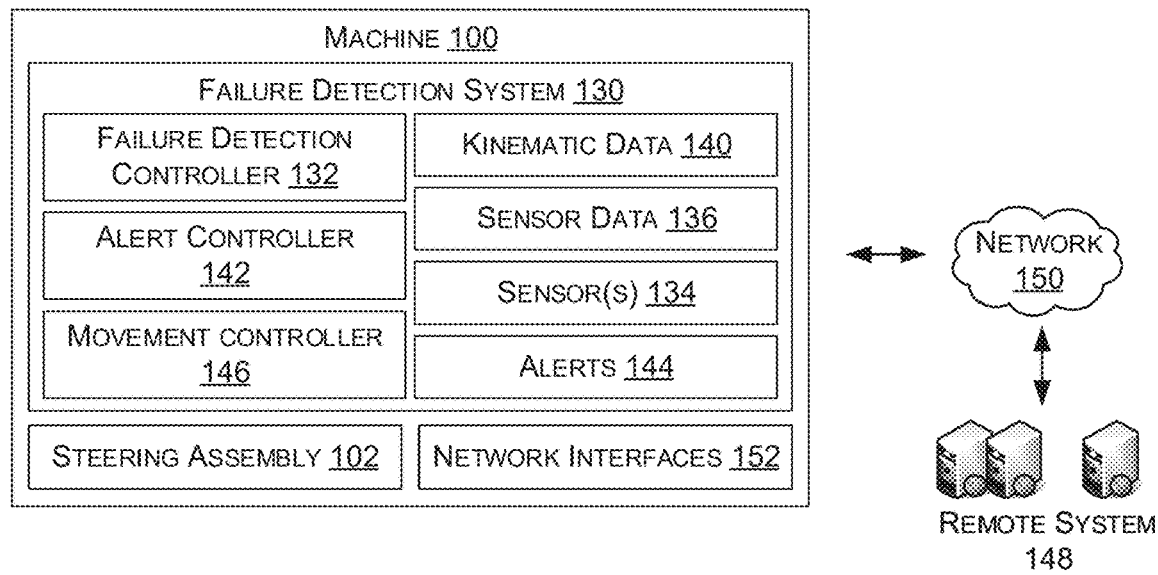
FIG. 1 illustrates an example machine including an example steering assembly for determining steering angles of the machine, according to an embodiment of the present disclosure.
Figure 1:
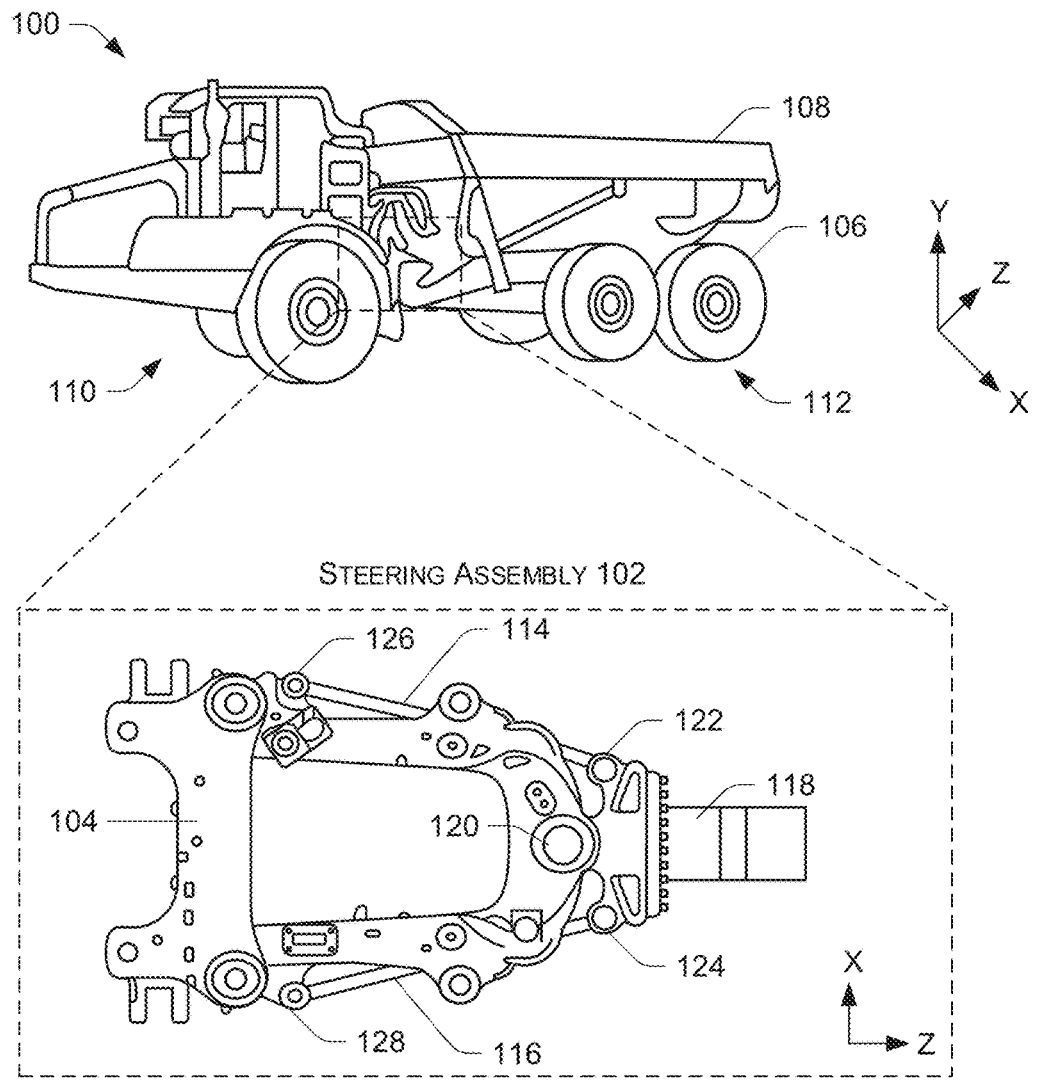

FIG. 1 is a schematic illustration of an example machine 100 with an example steering assembly 102, in accordance with examples of the disclosure. Although the machine 100 is depicted as a type of haul truck, the machine 100 may include any suitable machine, such as any type of loader, dozer, dump truck, compaction machine, backhoe, combine, scrapers, trencher, tractor, combinations thereof, or the like. In some instances, the machine 100 is configured, for example, for moving paving materials (e.g., asphalt), mined materials, soil, overburden, heavy construction materials, and/or equipment for road construction, building construction, other mining, paving and/or construction applications. For example, the machine 100 may be used in instances where materials, such as mineral ores, loose stone, gravel, soil, sand, concrete, and/or other materials of a worksite need to be transported at a worksite.

The machine 100 includes a frame 104 and wheels 106. The frame 104 is constructed from any suitable materials, such as iron, steel, aluminum, or other metals. The frame 104 is of a unibody construction in some cases, and in other cases, is constructed by joining two or more separate body pieces. Parts, or components, of the frame 104 are joined by any suitable variety of mechanisms, including, for example, welding, bolts, screws, fasteners, or the like.

The wheels 106 are mechanically coupled to a drive train (not shown) to propel the machine 100. The machine 100 includes an engine that is of any suitable type, size, power output, etc. In some instances, the engine may be gas-powered (e.g., diesel), natural gas powered, solar powered, or battery powered. When the engine is powered, the engine causes the wheels 106 to rotate, via the drive train, to enable the machine 100 to traverse an environment. As such, the engine is mechanically coupled to a variety of drive train components, such as a drive shaft and/or axles, to rotate the wheels 106 and propel the machine 100. In some instances, the drive train includes any variety of other components including, but not limited to a differential, connector(s), constant velocity (CV) joints, etc.

As shown, the machine 100 may be configured to carry material in a dump box 108 or other moveable element(s) configured to move, lift, carry, and/or dump materials. The dump box 108 is actuated by one or more hydraulic systems, or any other suitable mechanical system of the machine 100. In some instances, the hydraulic system is powered by the engine, such as by powering hydraulic pump(s) (not shown) of the hydraulic system. However, it should be noted that in other types of machines (e.g., machines other than a mining truck) the hydraulic system may be in a different configuration than the one shown in FIG. 1, may be used to operate element(s) other than a dump box 108, and/or may be omitted.

In some instances, the machine 100 may include a cabin or other such operator station. The operator station is configured to seat an operator (not shown) therein. The operator seated in the operator station interacts with various control interfaces and/or actuators (e.g., steering wheel, levers, buttons, joysticks, etc.) within the operator station to control movement of the machine 100 and/or various components of the machine 100, such as raising and lowering the dump box 108. Additionally, or alternatively, in some instances, and as discussed herein, the machine 100 may be remotely controlled by a remote operator or autonomously. For example, the machine 100 may operate autonomously along a predetermined path or route within an environment. In such instances, the machine 100 may include the operator station, or the operator station may be omitted. Further, the machine 100 may be remote controlled even in instances where an operator is positioned within the operator station.

The machine 100 shown in FIG. 1 is an articulated machine that includes a front 110 and a rear 112. The front 110 may include the engine, operator station, etc. while the rear 112 may include the dump box 108. As such, the machine 100 may be split into the front 110 and the rear 112, where the front 110 and the rear 112 are adjoined by a vertical hinge. In some instances, during steering, the front 110 turns to the steering direction of the machine 100.

The steering assembly 102 includes components that facilitate steering of the machine 100. In FIG. 1, a detailed view of the steering assembly 102 is shown. In some instances, the steering assembly 102 may include a first cylinder rod 114 and a second cylinder rod 116. The first cylinder rod 114 and the second cylinder rod 116 may include ends that are pivotably coupled to an oscillating hitch 118 of the machine 100. The oscillating hitch 118 may couple to a trailer of the machine 100 (e.g., the dump box 108). The oscillating hitch 118 may provide the machine 100 with steering articulation and ensure that the machine 100 maintains all-wheel contact.

The frame 104 may couple to the operator cabin, or the front 110, of the machine 100. As shown in FIG. 1, the oscillating hitch 118 and the frame 104 may couple to one another, in part, via pin 120. For example, the pin 120 may be disposed through aligned openings or holes in the oscillating hitch 118 and the frame 104. The pin 120 couples the frame 104 and the oscillating hitch 118, while still permitting the machine 100 to steer. For example, when the front 110 of the machine 100 is controlled to turn or otherwise steer, the rear 112 of the machine 100, e.g., via the oscillating hitch 118, can pivot about the pin 120 (or a vertical axis of the pin 120) relative to the front 110.

The oscillating hitch 118 is shown including flanges on opposing lateral sides for receiving the first cylinder rod 114 and the second cylinder rod 116, respectively. For example, a first side of the oscillating hitch 118 may include first flanges 122 (an upper-most one of which is shown). The first cylinder rod 114 may be coupled to the oscillating hitch 118 via a pin disposed through aligned openings of the first cylinder rod 114 and the first flanges 122. As also illustrated in FIG. 1, a second side of the oscillating hitch 118, opposite the first side of the oscillating hitch 118, includes one or more second flanges 124 (an upper-most one of which is illustrated). The second cylinder rod 116 may couple to the oscillating hitch 118 via a pin disposed through aligned openings in the second cylinder rod 116 and the second flanges 124. For example, as the machine 100 steers, the pins may permit rotational movement of the first cylinder rod 114 and the second cylinder rod 116 on, about, or relative to the oscillating hitch 118. Although not illustrated in FIG. 1, bearings, knuckles, and/or other joints may be included at the coupling of the first cylinder rod 114 to the first flanges 122 and/or the second cylinder rod 116 to the second flanges 124 (e.g., to restrict some motion as the machine 100 traverses terrain, steers, and so forth). Moreover, although the first flanges 122 and the second flanges 124 are illustrated and described as facilitating attachment of the first cylinder rod 114 and the second cylinder rod 116 to the oscillating hitch 118, other coupling arrangements that allow for pivoting (e.g., in the x-z plane) of the first cylinder rods 114 and the second cylinder rod 116 relative to the oscillating hitch 118 may be used.

Opposing ends of the first cylinder rod 114 and the second cylinder rod 116 not coupled to the oscillating hitch 118 may couple to projections of the frame 104 (or subframe). For example, a first side of the frame 104 may include first projections 126. The first cylinder rod 114 may couple to the frame 104 via a pin disposed through aligned openings in the first cylinder rod 114 and the first projections 126. Further, a second side of the frame 104 may include second projections 128, opposite the first side of the frame 104. The second cylinder rod 116 may couple to the frame 104 via a pin disposed through aligned openings in the second cylinder rod 116 and the second projections 128. Bearings, knuckles, or other joints may also be included to permit pivotable movement of the first cylinder rod 114 and the second cylinder rod 116 (e.g., as the machine 100 traverses terrain, steers, and so forth). For example, as the machine 100 steers, the pins may permit rotational movement of the first cylinder rod 114 and the second cylinder rod 116 on, about, or relative to the frame 104. Although not illustrated in FIG. 1, bearings, knuckles, and/or other joints may be included at the coupling of the first cylinder rod 114 to the first projections 126 and/or the second cylinder rod 116 to the second projections 128 (e.g., to restrict some motion as the machine 100 traverses terrain, steers, and so forth). Moreover, although the first projections 126 and the second projections 128 are illustrated and described as facilitating attachment of the first cylinder rod 114 and the second cylinder rod 116 to the frame 104, other coupling arrangements that allow for pivoting (e.g., in the x-z plane) of the first cylinder rod 114 and the second cylinder rod 116 relative to the frame 104 may be used.

In some instances, the first cylinder rod 114 and the second cylinder rod 116 may extend through, over, or along portions of the frame 104, between a location at which the first cylinder rod 114 and the second cylinder rod 116 couple to the oscillating hitch 118 and the frame 104, respectively. In some instances, the first cylinder rod 114 and the second cylinder rod 116 may be referred to as simply "cylinder(s)." In some instances, the first cylinder rod 114 and/or the second cylinder rod 116 may represent linear actuators that extend and retract to various lengths upon actuation of a steering mechanism of the machine 100. For example, when a steering mechanism, such as a steering wheel, (not shown) is actuated (e.g., turned) by an operator of the machine 100 (or by a remote operator) to indicate a desired movement of the machine 100, a controller may generate and transmit an associated control signal to the first cylinder rod 114 and the second cylinder rod 116. In response, the first cylinder rod 114 and the second cylinder rod 116 may actuate to steer the machine 100. In some instances, arms, shafts, gears, etc. may operably couple the steering wheel to the steering assembly 102 for steering the machine 100.

In some instances, the first cylinder rod 114 and the second cylinder rod 116 may be actuated using pneumatics or hydraulics. The machine 100 may include reservoirs (not shown) for accommodating the different extended lengths of the first cylinder rod 114 and the second cylinder rod 116. In some instances, the steering assembly 102 may represent an electro-hydraulic steering system or be a component of an electro-hydraulic steering system. For example, in electro-hydraulic power steering, an electric motor may drive a pump for supplying pressure necessary for power steering. As such, the steering assembly 102 may be electronically controlled. The machine 100 may include a controller (e.g., steering controller) that generates and transmits a control signal to the first cylinder rod 114 and the second cylinder rod 116, respectively, for steering the machine. The control signal may be generated in response to an operator moving a steering wheel or a remote operator electronically providing a desired level of steering. In such instances, the control signal may be associated with the desired level of steering. For example, in response to the operator moving the steering wheel a control signal may be provided to the first cylinder rod 114 (or a controller coupled thereto). This control signal may be associated with an instructed steering angle of the machine 100 (e.g., ten degrees, thirty degrees, etc.). The first cylinder rod 114 may extend or retract in response to the control signal, and based on the desired level of steering. Respective control signals may be sent to the first cylinder rod 114 and the second cylinder rod 116 depending on the level of steering.

The first cylinder rod 114 and the second cylinder rod 116 include a cylinder portion and a rod portion. The rod portion may be received by the cylinder portion such that the rod portion may extend from the cylinder portion by varying lengths. In other words, the rod portion may extend from or retract into the cylinder portion. In some instances, the steering assembly 102 may represent an articulated steering mechanism. In articulated steering, front and rear portions (e.g., the frame 104 and the oscillating hitch 118) are connected by a vertical hinge (e.g., the pin 120). Depending on the steering of the machine 100, the rod portion may either extend from the cylinder portion or retract into the cylinder portion. Moreover, given the configuration of the steering assembly 102 as shown in FIG. 1, when the machine 100 is turned left or right, one of the rod portion of the first cylinder rod 114 or the second cylinder rod 116 may extend from the cylinder portion, while another of the rod portion of the first cylinder rod 114 or the second cylinder rod 116 may retract into the cylinder portion.

The machine 100 is shown including a failure detection system 130. Generally, the failure detection system 130 functions to determine a failure of the steering assembly 102, or components thereof. For example, the first cylinder rod 114 and/or the second cylinder rod 116 may fail (e.g., crack, bend, break, etc.). Additionally, the instructed steering angle (or amount of steering) may be different than a measured steering angle. This may lead to the machine 100 not steering as expected. Upon detecting a failure, the operation of the machine 100 may be controlled. In the event of a linkage failure, the operator would notice a change in the steering behavior and bring the machine 100 to a safe stop. However, as discussed herein, in instances where the machine 100 is remotely controlled, the remote operator may not be able to detect the change in the steering behavior for understanding the fault of the steering assembly 102. In these instances, the failure detection system 130 may function to determine a health, integrity, or failure of the steering assembly 102 for outputting notifications or bringing the machine 100 to a safe stop to avoid further damage.

Figure 4:
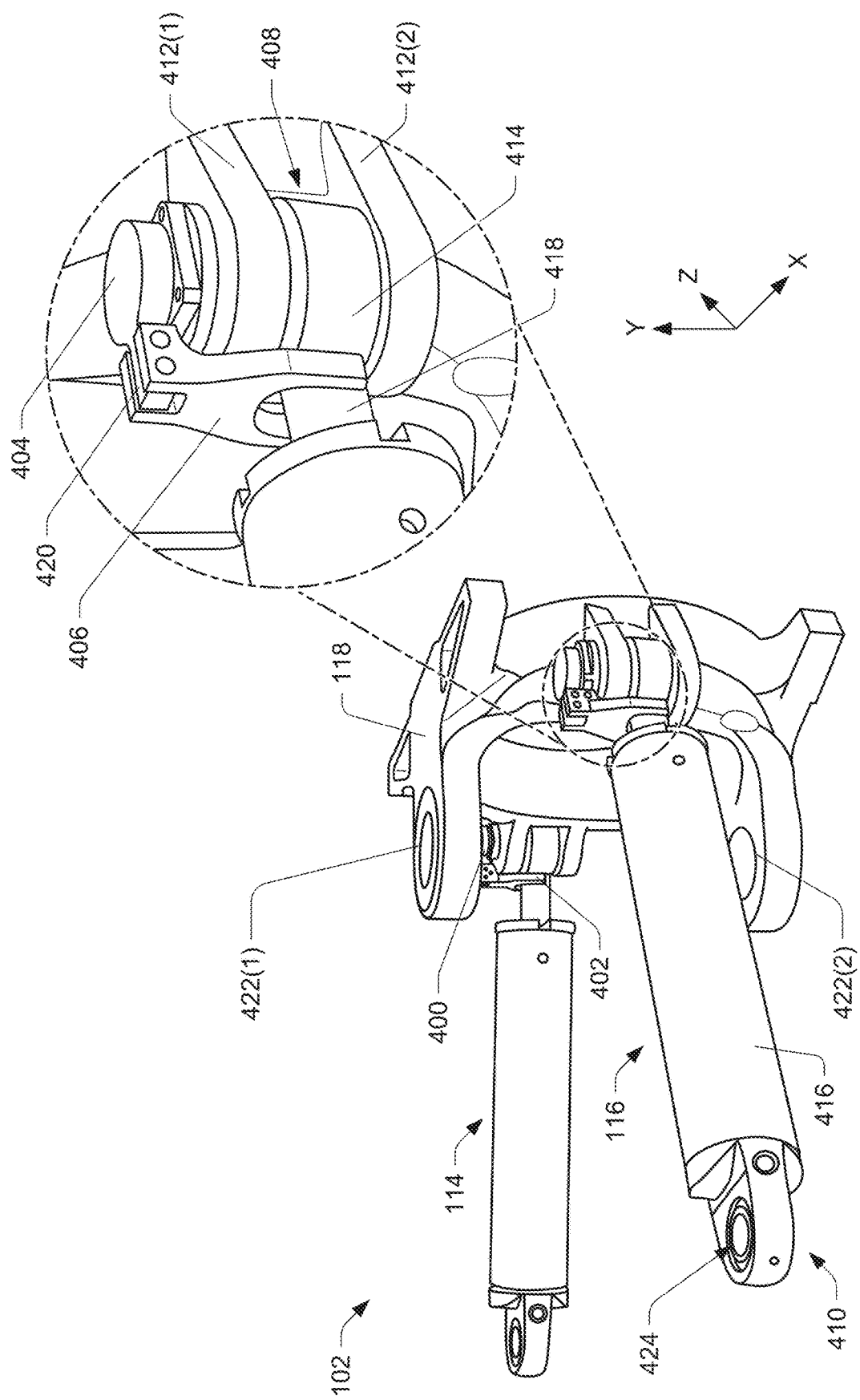
FIG. 4 illustrates a perspective detailed view of the steering assembly of FIG. 1, with an example isolating mechanism, according to an embodiment of the present disclosure.

The failure detection system 130 may include a failure detection controller 132 that determines failures within the steering assembly 102. Sensor(s) 134 (as shown in FIG. 4) may generate, capture, or collect sensor data 136 associated with the steering assembly 102. In some instances, the sensor data 136 may indicate measured steering angles between the front 110 and the rear 112 of the machine 100. In some instances, a first sensor may operably couple to the first cylinder rod 114 and a second sensor may operably couple to the second cylinder rod 116. In such instances, as the first cylinder rod 114 extends or retracts, the first sensor may measure a steering angle of the machine 100 given the operable coupling to the first cylinder rod 114. Similarly, as the second cylinder rod 116 extends or retracts, the second sensor may measure a steering angle of the machine 100 given the operable coupling to the second cylinder rod 116. The first sensor and the second sensor are placed at pinned locations of the first cylinder rod 114 and the second cylinder rod 116 for use in determining a kinematic transformation to measure the machine steering angles. In this manner, the first sensor and the second sensor are not co-located, and are separate components, located opposite of each other on the machine 100.

As discussed herein, the steering angles measured at sides of the machine 100 may represent an angle between the frame 104 and a longitudinal axis disposed through the first cylinder rod 114, as well as a longitudinal axis disposed through the second cylinder rod 116. As the machine 100 maneuvers, the steering angles may adjust. The steering angles may be correlated to one another to determine whether the steering assembly 102 is properly functioning. For example, a kinematic relationship exists between a first steering angle at the first side of the machine 100 and a second steering angle at the second side of the machine 100. If properly functioning, the steering angles sensed by the sensor(s) 134 may be constrained by the steering assembly 102 and include a defined kinematic relationship (given the linkages of the steering assembly).

To determine the kinematic relationship, the failure detection controller 132 may have access to kinematic data 140. The kinematic data 140 may include associations or orientations between the components of the steering assembly 102. For example, in some instances, the steering angles may be determined through known dimensions, lengths, orientations, etc. of the first cylinder rod 114 and/or the second cylinder rod 116. That is, given the coupling of the first cylinder rod 114 and the second cylinder rod 116 to the oscillating hitch 118 and the frame 104, the failure detection controller 132 may use the kinematic data 140 to determine the kinematic relationship between the steering angles sensed by the first sensor and the steering angles sensed by the second sensor. Using the kinematic data 140, the first steering angle and the second steering angle may be associated with one another given the limited range of motions of the steering assembly 102. The kinematic data 140 may also include known movement characteristics of the first cylinder rod 114 and the second cylinder rod 116, maximum extensions or ranges the first cylinder rod 114 and the second cylinder rod 116, and so forth. The kinematic data 140 may also indicate the connections or couplings between the first cylinder rod 114 with the frame 104 and the oscillating hitch 118, and/or the second cylinder rod 116 with the frame 104 and the oscillating hitch 118, for example.

By way of brief example, the failure detection controller 132 may receive first sensor data from the first sensor coupled to the first cylinder rod 114 and second sensor data from the second sensor coupled to the second cylinder rod 116. The failure detection controller 132 may determine a first steering angle from the first sensor data and a second steering angle from the second sensor data. Using the first steering angle and the kinematic data 140, the failure detection controller 132 may determine a predicted or expected steering angle associated with the second cylinder rod 116. This expected steering angle may be compared against the actual second steering angle, as measured (i.e., via the second sensor data). If the expected steering angle and the second steering angle are within a certain threshold this may indicate that the steering assembly 102 is functioning properly. However, if the expected steering angle and the second steering angle are not within a certain threshold, this may indicate that the steering assembly 102 is not functioning properly. Additionally, or alternatively, in some instances, using the second steering angle and the kinematic data 140, the failure detection controller 132 may determine a predicted or expected steering angle associated with the first cylinder rod 114. This expected steering angle may be compared against the actual first steering angle, as measured (i.e., via the first sensor data). If the expected steering angle and the first steering angle are within a certain threshold, this may indicate that the steering assembly 102 is functioning properly. However, if the expected steering angle and the first steering angle are not within a certain threshold, this may indicate that the steering assembly 102 is not functioning properly.

In some instances, the failure detection controller 132 may also compare the measured steering angles against instructed levels of steering. For example, during a steering operation, an operator may provide commands that are associated with a desired amount of steering. These commands may be provided as signals that control actuation of the first cylinder rod 114 and the second cylinder rod 116. Moreover, the signals may be correlated with certain steering angles of the machine 100. In some instances, the steering angles may be determined, or associated with the machine direction, speed, weight balance, load, and/or braking. The failure detection controller 132 may compare the instructed steering angles (or the amount of steering) against the measured steering angles. For example, if the first cylinder rod 114 actuates to a certain length associated with an instructed steering angle, this angle may be compared against the measured first steering angle. If a threshold difference exists there between, this may be indicative of a failed steering assembly 102.

In some instances, the sensor(s) 134 may include capacitive-type sensors, hall effect sensors, eddy current sensors, piezo-electric sensors, photodiodes, or any combination thereof. The sensor(s) 134 may be environmentally robust to resist liquid ingress, and withstand environments of the machine 100, such as a mud, dirt, rocks, dust, ice, snow, and so forth. The sensor(s) 134 may include seals, gaskets, or bushings to seal the sensor(s) 134 from environmental conditions. In some instances, the sensor(s) 134 may include a resolution of 0.035 degrees rotation per bit or better. Additionally, the sensor(s) 134, or the sensor data 136 reported by the sensor(s) 134, may be monotonic. This way, the steering angles as measured may either be increasing or decreasing.

As described herein, the sensor(s) 134 sense relative rotation of steering components. The sensor data can be used in a number of applications. For example, and as detailed herein, sensor outputs may be considered to identify steering system failures, to provide feedback, e.g., in a steering feedback loop, and/or to implement a haptic feedback system (e.g., by providing a vibration or resistance as a control aid, warning, coaching, or the like). For example, precise angular measurements may be required to implement some or all of these functions, and in some instances, a resolution of 0.035 degrees rotation per bit or better may be required. For instance, and without limitation, a haptic feedback system may require sensor data having a 0.035 degrees rotation per bit fidelity to provide the operator with a continuous range of haptic feedback and eliminate experienced jerks in feedback.

The sensor(s) 134 may be located external to the first cylinder rod 114 and the second cylinder rod 116, respectively, to reduce repair time and cost. As discussed herein, the sensor(s) 134 may be mounted vertically above a point of rotation at which the first cylinder rod 114 and the second cylinder rod 116 couple to the oscillating hitch 118, respectively. In some instances, the sensor(s) 134 may be mounted above pins that couple the first cylinder rod 114 and the second cylinder rod 116 to the oscillating hitch 118, respectively. The mounting of the sensor(s) 134 may include a mechanism configured to isolate an undesired influence on the steering angle, such as an isolation mechanism described further below. For example, roll of the first cylinder rod 114 and the second cylinder rod 116 (about the ball joint coupling the first cylinder rod 114 and the second cylinder rod 116 to the oscillating hitch 118, respectively) may impart undesired influence on the steering angles.

During steering of the machine 100, one of the first cylinder rod 114 or the second cylinder rod 116 will extend, while the other of the first cylinder rod 114 or the second cylinder rod 116 will retract. For example, in response to a steering command (e.g., turning a steering wheel), the first cylinder rod 114 may extend a first distance and the second cylinder rod 116 may retract a second distance. If this kinematic relationship is maintained, the failure detection controller 132 may not detect a failure. However, if the kinematic relationship of the first cylinder rod 114 and the second cylinder rod 116 (e.g., stroke length) is not maintained (or outside a certain threshold) then the failure detection controller 132 may detect a failure.

In some instances, the sensor(s) 134 may measure the stroke length of the first cylinder rod 114 and the second cylinder rod 116, respectively, to determine the steering angles through a kinematic transformation. The kinematic data 140, or a kinematic relationship between the stroke length of the first cylinder rod 114 and the second cylinder rod 116, may be used to measure the steering angles of the machine. Further, the first cylinder rod 114 and the second cylinder rod 116 may be physically constrained and extended to certain length. Therefore, the stroke length of the first cylinder rod 114 and the second cylinder rod 116 may be correlated to steering angles.

The failure detection system 130 may include an alert controller 142 that functions to output notifications, indications, or other alerts 144. For example, the failure detection controller 132 may communicate with the alert controller 142, and in response, the alert controller 142 may output one or more alerts 144. The alerts 144 may indicate the detection of a fault within the steering assembly 102, and/or specific components of the steering assembly 102 (e.g., first cylinder rod 114). By way of example, if the first cylinder rod 114 breaks, the expected steering angle and measured steering angle of the first cylinder rod 114 may be different (or a threshold difference). This may trigger the alert 144 indicating the failure, and in response, the operator may bring the machine 100 to a stop. In instances where the machine 100 is remotely controlled, the alert 144 may trigger one or more automatic actions (e.g., stop) or serve to notify a remote operator for taking one or more actions. In some instances, the alerts 144 may be audible (e.g., series of beeps), visual (e.g., lights), haptic (e.g., vibrational), etc. The alerts 144 may also be information output on a user interface (UI) within the operator station. For example, the alerts 144 may be an indication output on the UI that indicates a failure of one or more components of the steering assembly 102, to schedule maintenance for the steering assembly 102, and so forth.

The failure detection system 130 may additionally include a movement controller 146. In some examples, based on detecting a fault at the steering assembly 102, movement of the machine 100 may be restricted or otherwise controlled. The movement controller 146 may be configured to restrain, brake, or prevent movement of the machine 100. For example, in the event that the failure detection controller 132 determines a fault, the movement controller 146 may apply braking at the machine 100 and/or power down components of the machine 100 (e.g., engine). In some instances, the failure detection controller 132 may instruct the movement controller 146 to restrain or restrict movement of the machine 100 to prevent further damage to the steering assembly 102 (or components of the machine 100). Additionally, or alternatively, the movement controller 146 may restrain or restrict movement of the machine 100 based on the alerts 144 being output by the alert controller 142.

In some instances, the machine 100 may communicatively couple to a remote computing device or a remote system 148. The machine 100 may be in communication with the remote system 148 via a network 150. The network 150 may be a local area network ("LAN"), a larger network such as a wide area network ("WAN"), or a collection of networks, such as the Internet. Protocols for network communication (e.g., wireless machine-to-machine communication protocols), such as TCP/IP, may be used to implement the network 150.

Network interfaces 152 may enable the machine 100 to communicate via the network 150 with the remote system 148. The network interfaces 152 may include a combination of hardware, software, and/or firmware and may include software drivers for enabling any variety of protocol-based communications, and any variety of wireline and/or wireless ports/antennas. For example, the network interfaces 152 may comprise one or more of WiFi, cellular radio, a wireless (e.g., IEEE 802.1x-based) interface, a Bluetooth® interface, and the like.

In some instances, the remote system 148 may be implemented as one or more servers and may, in some instances form a portion of a network-accessible computing platform implemented as a computing infrastructure of processors, storage, software, data access, and so forth that is maintained and accessible via the network 150 such as the Internet. Cloud-based systems may not require end-user knowledge of the physical location and configuration of the system that delivers the services. For example, the remote system 148 may be located in an environment of the machine 100 (e.g., worksite) and/or may be located remotely from the environment. Common expressions associated for the remote system 148 include "on-demand computing", "software as a service (SaaS)", "platform computing", "network-accessible platform", "cloud services", "data centers", and so forth.

In any of the examples described herein, the functionality of the failure detection system 130 may be distributed so that certain operations are performed by the machine 100 and other operations are performed by the remote system 148. For example, given that the remote system 148 may have a computational capacity that far exceeds the machine 100, the remote system 148 may determine patterns of the sensor data 136 for accurately determining failures at the steering assembly 102. In such instances, the sensor(s) 134 may generate the sensor data 136 indicating the steering angles and the sensor data 136 may be transmitted to the remote system 148. In response, the remote system 148 may analyze the sensor data, comparing the steering angles, for use in determining faults of the steering assembly 102. In instances where the remote system 148 determines a fault, the remote system 148 may transmit the alert 144 back to the machine 100 for output. Additionally, or alternatively, the remote system 148 may communicate with the remote operator for outputting the alert 144. Further, the remote system 148 may instruct the machine 100 to restrain or halt movement via the movement controller 146. Accordingly, the remote system 148 may control operations of the machine 100 and/or determine faults of the steering assembly 102.

Although illustrated as including certain components, the machine 100 may further include any number of other components within the operator station such as, one or more of a location sensor (e.g., global positioning system (GPS)), an air conditioning system, a heating system, collision avoidance systems, cameras, etc. These components and/or systems are powered by any suitable mechanism, such as by using a direct current (DC) power supply powered by the engine along with a generator (not shown) and/or inverter (not shown), an alternating current (AC) power supply powered by the engine and a generator, and/or by mechanical coupling to the engine. The machine 100 may include controllers that communicatively couple to the components and/or systems for controlling their operation.

The machine 100, controllers or modules of the machine 100 (e.g., the failure detection controller 132) may include processor(s) and/or memory. The processor(s) may carry out operations stored in the memory. Where present, the processor(s) may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

The memory may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

The machine 100 and/or the remote system 148 may include components for determining failures of the steering assembly 102. The machine 100 and the remote system 148 may communicatively couple to one another for permitting remote control of the machine, and transmission of data. In the event that failures are detected, alerts 144 may be output and/or movement of the machine 100 may be limited. The sensor 134 used for determining faults may be located external to the cylinder rods for reducing repair cost, time, and effort. In turn, the machine 100 may have increased availability.

Figure 2:
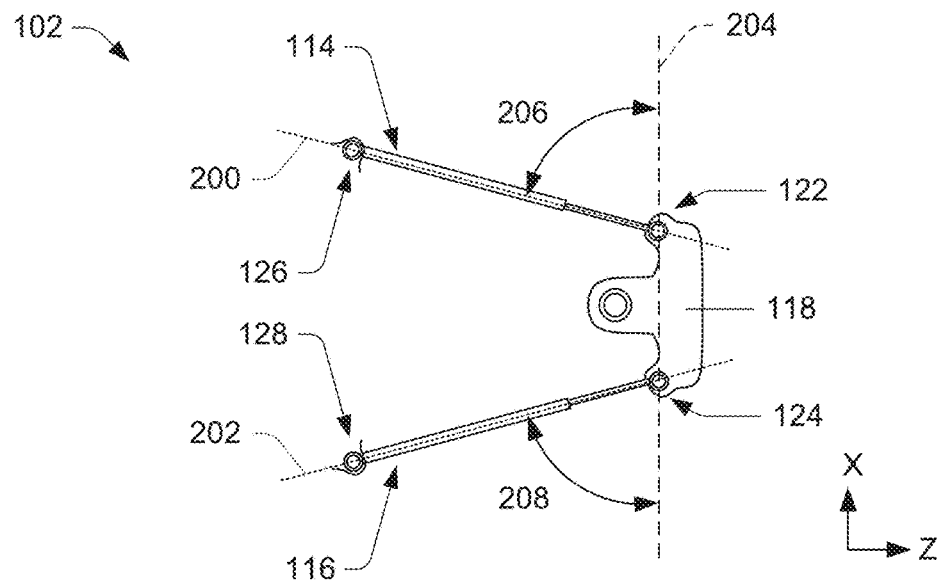
FIG. 2 illustrates the steering assembly of FIG. 1, showing example steering angles of the machine, according to an embodiment of the present disclosure.

FIG. 2 illustrates a partial view of the steering assembly 102. In FIG. 2, portions of the machine 100, such as portions of the frame 104, are omitted. FIG. 2 illustrates in more detail aspects of the coupling of the first cylinder rod 114 and the second cylinder rod 116 to the oscillating hitch 118 and the frame 104.

As shown, the first cylinder rod 114 may couple to the oscillating hitch 118, at the first flanges 122, and to the frame 104 at the first projections 126. Noted above, a pin may be disposed through the first cylinder rod 114 and the first flanges 122 for coupling the first cylinder rod 114 to the oscillating hitch 118. A pin may also be disposed through the first cylinder rod 114 and the first projections 126 for coupling the first cylinder rod 114 to the frame 104. Additionally, a pin may be disposed through the second cylinder rod 116 and the second flanges 124 for coupling the second cylinder rod 116 to the oscillating hitch 118. A pin may be disposed through the second cylinder rod 116 and the second projections 128 for coupling the second cylinder rod 116 to the frame 104.

The first cylinder rod 114 is shown extending along a first longitudinal axis 200 and the second cylinder rod 116 is shown extending along a second longitudinal axis 202. The first longitudinal axis 200 may be disposed through central positions at which the first cylinder rod 114 is pinned to the oscillating hitch 118 and the frame 104, respectively. Likewise, the second longitudinal axis 202 may be disposed through central positions at which the second cylinder rod 116 is pinned to the oscillating hitch 118 and the frame 104, respectively.

A steering axis 204 is shown extending though the pinned locations at which the first cylinder rod 114 and the second cylinder rod 116 couple to the oscillating hitch 118. For example, the steering axis 204 may be disposed through central positions of pins coupling the first cylinder rod 114 and the second cylinder rod 116 to the oscillating hitch 118, respectively. Steering angles may be measured between the longitudinal axes of the first cylinder rod 114 and the second cylinder rod 116, and the steering axis 204, respectively. For example, a first steering angle 206 may represent an angle between the first longitudinal axis 200 and the steering axis 204. A second steering angle 208 may represent an angle between the second longitudinal axis 202 and the steering axis 204. In the example illustrated in FIG. 2, the machine 100 is traveling in a straight line, e.g., normal to the steering axis 204. In this orientation, the first steering angle 206 and the second steering angle 208 may be equal, or substantially equal.

A first sensor (discussed in more detailed herein) operably coupled to the first cylinder rod 114 may determine, or measure, the first steering angle 206, and a second sensor operably coupled to the second cylinder rod 116 may determine, or measure, the second steering angle 208. As introduced above, the first steering angle 206 and the second steering angle 208, as well as the kinematic data 140, may be used by the failure detection controller 132 for determining faults within the steering assembly 102. For example, the failure detection controller 132 may receive first sensor data from the first sensor and second sensor data from the second sensor. From this data, the failure detection controller 132 may determine the first steering angle 206 and the second steering angle 208, respectively. These steering angles, respectively, may represent measured steering angles.

Using the first steering angle 206 and the kinematic data 140, the failure detection controller 132 may determine a predicted or expected second steering angle 208. That is, the kinematic data 140 may correlate the first steering angles 206 with respective second steering angles 208. The angles stored as the kinematic data 140 may be determined through testing, modelling, and/or the like, and correspond to proper functioning of the steering assembly 102. In other words, knowing the first steering angle 206, the failure detection controller 132 may use the kinematic relationships stored as the kinematic data 140 to determine the second steering angle 208. As a result, the failure detection controller 132 may determine an expected second steering angle, or a steering angle that is expected of the second steering angle 208. The failure detection controller 132 may compare the measured steering angle (e.g., the second steering angle 208) with the expected steering angle, as determined from the first steering angle 206 and the kinematic data 140. If the expected steering angle and the second steering angle 208 are within a certain threshold, this may indicate that the steering assembly 102 is functioning properly. However, if the expected steering angle and the second steering angle 208 are not within the threshold, the failure detection controller 132 may determine that the steering assembly 102 is not functioning properly.

In some instances, this process may repeat for determining an expected first steering angle, using the second steering angle 208 and the kinematic data 140. That is, knowing the second steering angle 208, the failure detection controller 132 may use the kinematic data 140 for determining a kinematic relationship between the first steering angle 206 and the second steering angle 208. As a result, the failure detection controller 132 may determine an expected first steering angle, or a steering angle that is expected of the first steering angle 206. The failure detection controller 132 may compare the measured steering angle (i.e., the first steering angle 206) with the expected steering angle, as determined from the second steering angle 208 and the kinematic data 140. If the expected steering angle and the first steering angle 206 are within a certain threshold, this may indicate that the steering assembly 102 is functioning properly. However, if the expected steering angle and the first steering angle 206 are not within a certain threshold, this may indicate that the steering assembly 102 is not functioning properly.

In some instances, the failure detection controller 132 may determine expected steering angles for one side of the machine 100 and/or both sides of the machine 100. For example, using the first steering angle 206, the failure detection controller 132 may determine an expected second steering angle using the kinematic data 140. Additionally, the second steering angle 208 may be measured using the second sensor. If the second steering angle 208 and the expected second steering angle are different, this may indicate a failure of the steering assembly 102. However, this process may not repeat for using the second steering angle 208 to determine an expected first steering angle.

As it pertains to FIG. 2, because the machine 100 is shown traveling in a straight line (i.e., straight forward), the first steering angle 206 and the second steering angle 208 should be equal or substantially equal. For example, if the first steering angle 206 is measured to be 80 degrees, using the kinematic relationship, the failure detection controller 132 may determine that the expected second steering angle should be substantially 80 degrees. If the measured second steering angle 208 is not within a certain threshold of 80 degrees (e.g., one degree), the steering assembly 102 may not be functioning properly. For example, the first cylinder rod 114 and/or the second cylinder rod 116 may be broken, bent, fractured, etc. Alternatively, rather than determining an expected second steering angle, if the second steering angle 208 is measured to be 80 degrees, using the kinematic relationship, the failure detection controller 132 may determine that the expected first steering angle should be substantially 80 degrees. If the measured first steering angle 206 is not within a certain threshold of 80 degrees, the steering assembly 102 may not be functioning properly. For example, the first cylinder rod 114 and/or the second cylinder rod 116 may be broken, bent, fractured, etc.

In some instances, as the machine 100 maneuvers or as the first cylinder rod 114 actuates to steer the machine 100, the first cylinder rod 114 may experience rotation (e.g., roll, twisting, etc.) about the first longitudinal axis 200 (Z-axis). In some instances, the cylinder portion and/or the rod portion of the first cylinder rod may experience rotational movement. The bearings coupling the first cylinder rod 114 to the oscillating hitch 118 and the frame 104 may assist, or permit, this rotational movement. Similarly, in some instances, as the machine 100 maneuvers or as the second cylinder rod 116 actuates to steer the machine 100, the second cylinder rod 116 may experience rotation (e.g., roll, twisting, etc.) about the second longitudinal axis 202. In some instances, the cylinder portion and/or the rod portion of the second cylinder rod 116 may experience rotational movement. The bearings coupling the second cylinder rod 116 to the oscillating hitch 118 and the frame 104 may assist, or permit, this rotational movement.

In some instances, the first steering angle 206 and/or the second steering angle 208 may be compared against steering angles that are associated with desired amounts of steering. For example, as the operator steers the machine 100, the different amounts of steering may be associated with the first cylinder rod 114 and the second cylinder rod 116 extending and retracting by different amounts. The amount by which the first cylinder rod 114 and the second cylinder rod 116 extend and retract may be associated with steering angles. For example, instructing the first cylinder rod 114 to extend by a certain amount may be associated with an instructed steering angle. If the instructed steering angle and the first steering angle 206 (as measured) are different, this may be indicative of a failure of the steering assembly 102. The failure detection controller 132 may continuously perform this feedback loop for determining differences therebetween. For example, the failure detection controller 132 may continuously determine whether the measured steering angles align with the operator input.

Figure 3:
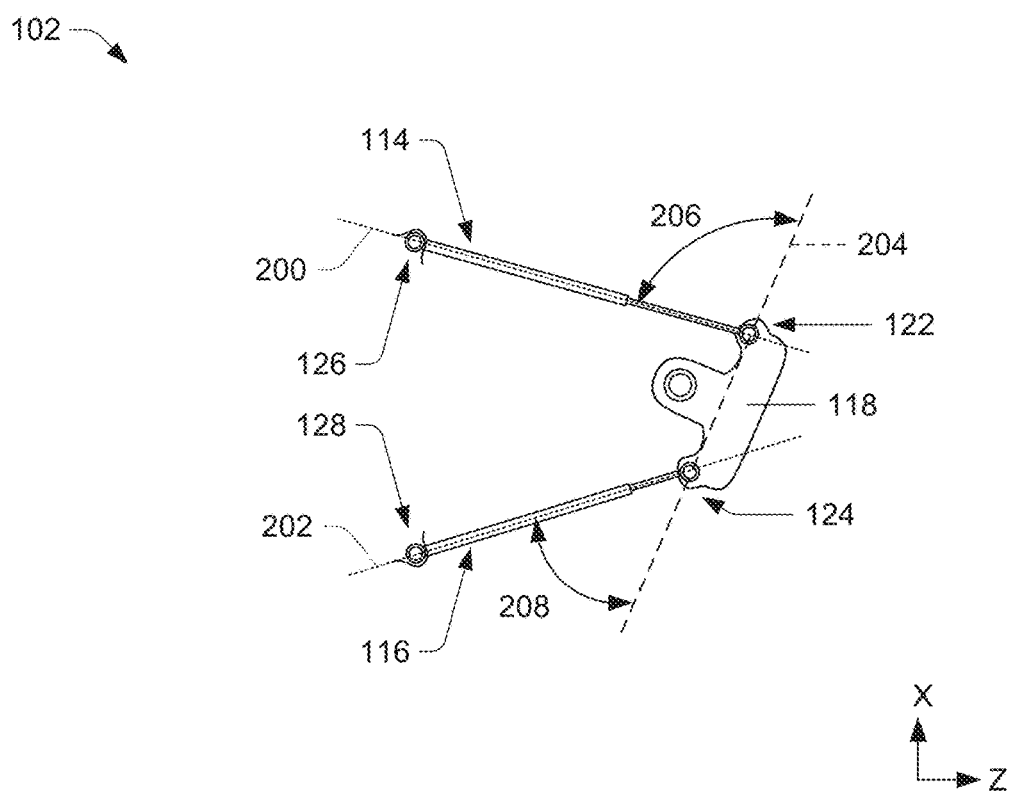
FIG. 3 illustrates the steering assembly of FIG. 1, showing example steering angles of the machine, according to an embodiment of the present disclosure.

FIG. 3 illustrates a partial view of the steering assembly 102 in an different configuration (or steering) as FIG. 2. Similar to FIG. 2, in FIG. 3, portions of the machine 100 are omitted, such as the frame 104, to illustrate the coupling of the first cylinder rod 114 and the second cylinder rod 116 between the oscillating hitch 118 and the frame 104.

The steering axis 204 is shown extending though the pinned locations at which the first cylinder rod 114 and the second cylinder rod 116 couples to the oscillating hitch 118. For example, the steering axis 204 may be disposed through central positions of pins coupling the first cylinder rod 114 and the second cylinder rod 116 couples to the oscillating hitch 118, respectively. Compared to FIG. 2 in which the machine 100 is traveling in a straight line, FIG. 3 illustrates a scenario in which the machine is making a left hand turn. As a result, the first cylinder rod 114 may extend to increase in length (e.g., a rod may extend from the cylinder), while the second cylinder rod 116 may retract to decrease in length (e.g., a rod may retract within the cylinder).

Further, compared to FIG. 2, FIG. 3 illustrates that the first steering angle 206 and the second steering angle 208 are different. The first steering angle 206 may represent an angle between the first longitudinal axis 200 and the steering axis 204. The second steering angle 208 may represent an angle between the second longitudinal axis 202 and the steering axis 204. The first sensor operably coupled to the first cylinder rod 114 may determine, or measure, the first steering angle 206, and a second sensor operably coupled to the second cylinder rod 116 may determine, or measure, the second steering angle 208.

As introduced above, the first steering angle 206 and the second steering angle 208, as well as the kinematic data 140, may be used by the failure detection controller 132. The failure detection controller 132 may receive first sensor data from the first sensor and second sensor data from the second sensor. Using the first steering angle 206 and the kinematic data 140, the failure detection controller 132 may determine a predicted or expected second steering angle 208. For example, the kinematic data 140 may correlate the first steering angles 206 with respective second steering angles 208. The failure detection controller 132 may compare the measured steering angle (e.g., the second steering angle 208) with the expected steering angle, as determined from the first steering angle 206 and the kinematic data 140. If the expected steering angle and the second steering angle 208 are within a threshold, the failure detection controller 132 may determine that the steering assembly 102 is functioning properly. However, if the expected steering angle and the second steering angle 208 are not within the threshold, the failure detection controller 132 may determine that the steering assembly 102 is not functioning properly.

Additionally, or alternatively, the failure detection controller 132 may determine an expected first steering angle, using the second steering angle 208 and the kinematic data 140. That is, knowing the second steering angle 208, the fault detection controller may use the kinematic data 140 for determining a kinematic relationship between the first steering angle 206 and the second steering angle 208. As a result, the failure detection controller 132 may determine an expected first steering angle, or a steering angle that is expected of the first steering angle 206. The failure detection controller 132 may compare the measured steering angle (e.g., the first steering angle 206) with the expected steering angle, as determined from the second steering angle 208 and the kinematic data 140. If the expected steering angle and the first steering angle 206 are within a certain threshold, this may indicate that the steering assembly 102 is functioning properly. However, if the expected steering angle and the first steering angle 206 are not within a certain threshold, this may indicate that the steering assembly 102 is not functioning properly.

As it pertains to FIG. 3, because the machine 100 is making a left hand turn, the first steering angle 206 may be greater than the second steering angle 208. For example, the first steering angle 206 may be measured to be 100 degrees. Using the kinematic relationship, the failure detection controller 132 may determine that the expected second steering angle should be substantially 50 degrees. If the measured second steering angle 208 is not within a certain threshold of 50 degrees, the steering assembly 102 may not be functioning properly. For example, the second cylinder rod 116 may be broken, bent, fractured, etc. Additionally, or alternatively, this process may repeat to confirm the functioning of the first cylinder rod 114. For example, if the second steering angle 208 is measured to be 50 degrees, using the kinematic relationship, the failure detection controller 132 may determine that the expected first steering angle should be substantially 110 degrees. If the measured first steering angle 206 is not within a certain threshold of 110 degrees, the steering assembly 102 may not be functioning properly. For example, the first cylinder rod 114 and/or the second cylinder rod 116 may be broken, bent, fractured, etc.

FIG. 4 illustrates a detailed view of the steering assembly 102, showing the first cylinder rod 114 and the second cylinder rod 116 coupling to the oscillating hitch 118. To measure the steering angles, such as the first steering angle 206 and the second steering angle 208, a first sensor 400 couples to the first cylinder rod 114 via a first isolating mechanism 402, and a second sensor 404 couples to the second cylinder rod 116 via a second isolating mechanism 406.

FIG. 4 further illustrates a detailed view of the coupling of the second cylinder rod 116 to the oscillating hitch 118. The detailed view illustrates the second isolating mechanism 406 operably coupled to the second cylinder rod 116 for measuring the second steering angle 208, as discussed herein. Although the discussion of FIG. 4, or the detailed view, is with regard to the second isolating mechanism 406, the first isolating mechanism 402 may function in a similar manner and couple to the first cylinder rod 114 for measuring the first steering angle 206.

The second cylinder rod 116 includes a first end 408 and a second end 410. The first end 408 may pivotably or rotationally couple to the oscillating hitch 118 via a pin disposed through a passage extending through the first end 408 of the second cylinder rod 116. Additionally, passages may extend through the second flanges 124, such as an upper flange 412(1) and a lower flange 412(2). As also shown, a rod eye 414 may be disposed between the upper flange 412(1) and the lower flange 412(2). The rod eye 414 may be integral to, or a component of, the second cylinder rod 116. The pin that couples the second cylinder rod 116 to the oscillating hitch 118 may further be disposed through the rod eye 414. In some instances, a bearing may be disposed within the rod eye 414 for assisting in the rotational movement.

The second end 410 of the second cylinder rod 116 may couple to the frame 104, such as via the second projections 128. The second end 410 of the second cylinder rod 116 is shown including a cylinder eye 424 (e.g., passage, opening, aperture, hole, etc.) through which a pin may be disposed for coupling the second cylinder rod 116 to the frame 104. A bearing may also be included to assist in rotation movement of the second end 410 (e.g., relative to the frame 104), as the second cylinder rod 116 extends and retracts to different lengths.

The second cylinder rod 116 is shown including a cylinder portion 416 and a rod portion 418. The cylinder portion 416 (e.g., the second end 410) couples to the frame 104, whereas the rod portion 418 (e.g., the first end 408) is shown coupled to the oscillating hitch 118. However, in some instances, the cylinder portion 416 may couple to the oscillating hitch 118 and in such instances, the rod portion 418 may couple to the frame 104. Additionally, or alternatively, the sensor(s) may couple to the frame 104 for measuring the steering angles of the machine 100.

The second sensor 404 is shown disposed vertically above a pin disposed through the first end 408, the upper flange 412(1), and the lower flange 412(2). In some instances, a center of the second sensor 404 may be concentric with a center of the pin, or a point of rotation of the first end 408. The second sensor 404 is shown including, or being coupled to, an arm 420. The arm 420 may laterally or radially extend outward from the second sensor 404 for engaging or coupling to the second isolating mechanism 406. Additional details of the second isolating mechanism 406 are discussed herein, however, in some instances, the second isolating mechanism 406 may include a first end coupled to the arm 420 and a second end, opposite the first end, coupled to the second cylinder rod 116. More particularly, the second end of the second isolating mechanism 406 may at least partially wrap around, engage, or be disposed over the rod portion 418 of the second cylinder rod 116. In doing so, as the machine 100 maneuvers and steers, the second cylinder rod 116 may pivot (e.g., rotate) and extend or retract (as discussed above in FIGS. 2 and 3). This motion may be imparted to the second isolating mechanism 406 given the operable coupling of the second isolating mechanism 406 with the rod portion 418. In turn, the motion may be sensed by the second sensor 404 for using in generating the sensor data 136. As such, the second end of the second isolating mechanism 406 may be configured to roll and follow the rotation movement of the second cylinder rod 116. In doing so, the second sensor 404 may measure the second steering angle 208.

In some instances, the second sensor 404 may remain stationary on the oscillating hitch 118 while the second isolating mechanism 406 translates (e.g., rotates) relative to the second sensor 404. For example, in a left hand turn (e.g., as shown and discussed in FIG. 3), the rod portion 418 may retract into the cylinder portion 416 and the second cylinder rod 116 may rotate about the pin (i.e., the pin coupling the second cylinder rod 116 to the oscillating hitch 118) in a counterclockwise manner (about the Y-axis). This movement, and the operable coupling of the second isolating mechanism 406 to the second cylinder rod 116 may cause the second end 410 of the second isolating mechanism 406 engaged with the second cylinder rod 116 to translate in the counterclockwise direction. This rotation may be imparted to the arm 420. The second sensor 404 may sense this movement and determine a steering angle (e.g., the second steering angle 208).

In a right hand turn, the rod portion 418 may extend from the cylinder portion 416 and the second cylinder rod 116 may rotate about the pin in a clockwise manner (about the Y-axis). This movement, and the operable coupling of the second isolating mechanism 406 to the second cylinder rod 116 may cause the second end 410 of the second isolating mechanism 406 engaged with the second cylinder rod 116 to translate in the clockwise direction. This rotation may be imparted to the arm 420 and the second sensor 404 may sense this movement and determine a steering angle (e.g., the second steering angle 208).

In some instances, the first isolating mechanism 402 and/or the second isolating mechanism 406 may engage with the cylinder portion of the first cylinder rod 114 and/or the second cylinder rod 116. That is, although the discussion herein is with regard to the second isolating mechanism 406 engaging the rod portion 418, the second isolating mechanism 406 may engage with the cylinder portion 416 of the second cylinder rod 116. In such instances, the second isolating mechanism 406 may be sized for fitting around the cylinder portion 416.

The location and coupling of the second isolating mechanism 406 to the second sensor 404 may isolate vertical movements experienced by the machine 100. In other words, the position of the second sensor 404 and the coupling of the second isolating mechanism 406 to the second sensor 404, via the arm 420, may avoid imparting interferences from other degrees of freedom not related to the second steering angle 208 (e.g., vertical displacement).

In some instances, although the first sensor 400, the second sensor 404, the first isolating mechanism 402, and the second isolating mechanism 406 are shown being couple to the oscillating hitch 118, or oscillating hitch 118 side, other embodiments are envisioned. For example, the first sensor 400 and the first isolating mechanism 402 may be located adjacent to the frame 104 for measuring the steering angle proximal to the frame 104. Additionally, or alternatively, the second sensor 404 and the second isolating mechanism 406 may be located adjacent to the frame 104 for measuring the steering angle proximal to the frame 104.

As further shown in FIG. 4, the oscillating hitch 118 may include a first passage 422(1) and a second passage 422(2) through which the pin 120 is disposed for coupling the oscillating hitch 118 to the frame 104 (or the front 110 and the rear 112 together).

Figure 5:
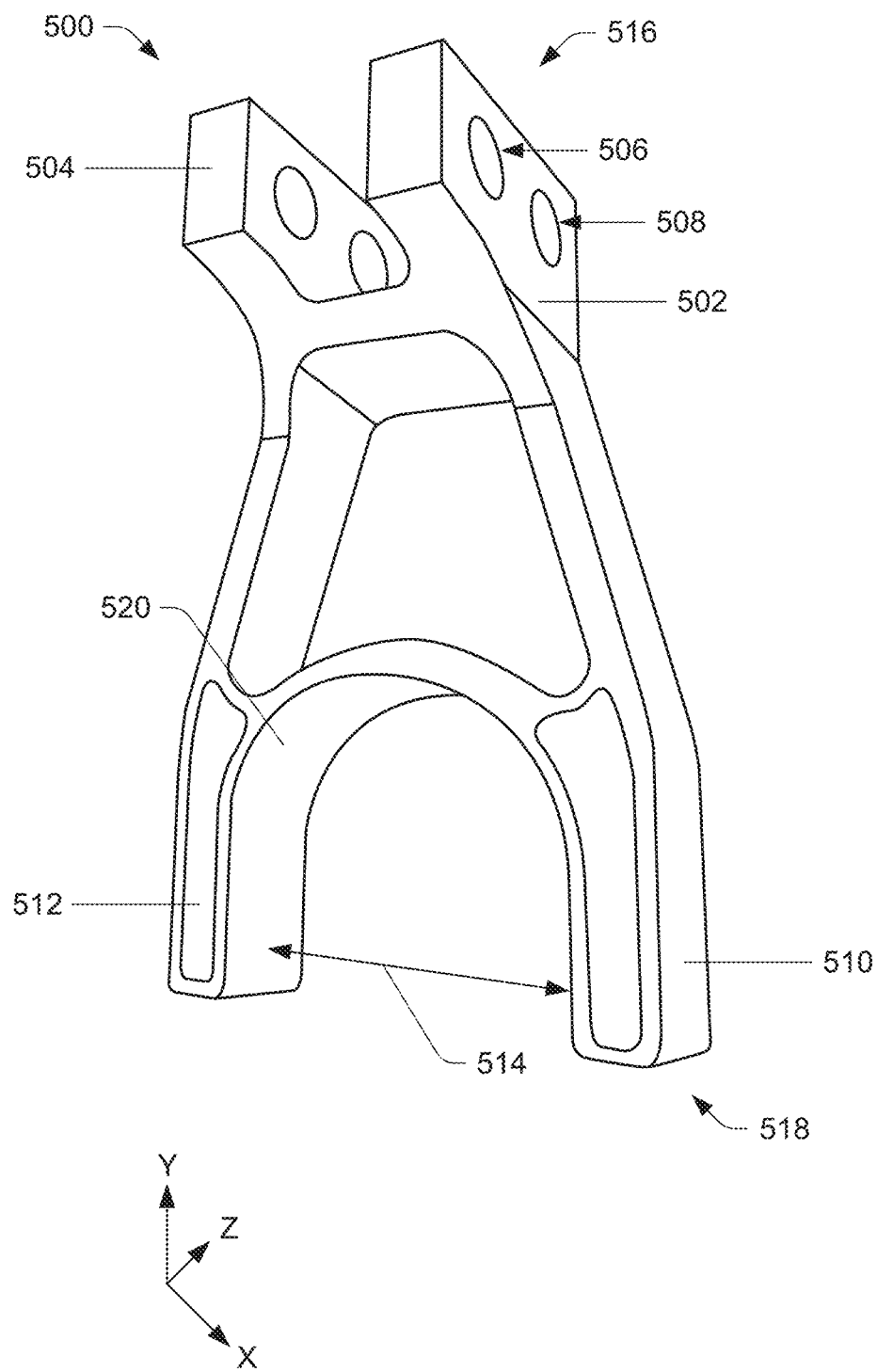
FIG. 5 illustrates a perspective view of the isolating mechanism of FIG. 4, according to an embodiment of the present disclosure.

FIG. 5 illustrates an isolating mechanism 500, which may represent or be represented of the first isolating mechanism 402 and/or the second isolating mechanism 406, as introduced above in FIG. 4. Generally, the isolating mechanism 500 may include a fork-shaped design, with a first end 516 and a second end 518. The first end 516 may couple to the arm 420 for imparting motion to the first sensor 400 or the second sensor 404. The second end 518 may include features for coupling to the first cylinder rod 114 or the second cylinder rod 116 (or rod portions thereof).

The first end 516 is shown including two supports, such as a first support 502 and a second support 504. The first support 502 and the second support 504 may be spaced apart by a distance equal, or substantially equal, to a width of the arm 420 (X-direction). A first set of passages 506 is shown extending through the first support 502 and the second support 504. Additionally, a second set of passages 508 is shown extending through the first support 502 and the second support 504. The first set of passages 506 and the second set of passages 508 may receive fasteners for coupling the isolating mechanism 500 to the arm 420. For example, the arm 420 may include corresponding passages that align with the first set of passages 506 and the second set of passages 508, respectively. Upon assembly, fasteners may be disposed through the first set of passages 506, and a first passage of the arm 420 that align with first set of passages 506. Additionally, fasteners may be disposed through the second set of passages 508, and a second passage of the arm 420 that aligns with second set of passages 508. These fasteners may secure the arm 420 to the isolating mechanism 500.

As shown, the first set of passages 506 and the second set of passages 508 may be spaced apart from one another in the Z-direction. In some instances, the first set of passage 506 and the second set of passages 508, as well as the passages of the of the arm 420, may be circular in shape. The first set of passages 506 and/or the second set of passages 508 may be lined with steel, or include steel inserts, for increased strength and/or to prevent the fasteners damaging the isolating mechanism 500.

The second end 518 may include two forks, tabs, or prongs, such as a first prong 510 and a second prong 512. The first prong 510 and the second prong 512 may engage with an exterior surface of the rod portion of the first cylinder rod 114 or the second cylinder rod 116. The first prong 510 and the second prong 512 may also engage with the rod portion at opposing sides, or surface. The first prong 510 and the second prong 512 may be spaced apart by a distance 514 that is equal to, or substantially equal to, a cross-sectional dimension of the rod portion. For example, the distance 514 may be substantially equal to the diameter of the rod portion. In some instances, the distance 514 may be sized slightly smaller than the cross-sectional dimension of the rod portion. Sizing the ends of the first prong 510 and the second prong 512 in this manner allows the isolating mechanism 500 to snap over the rod portion. In other words, the ends of the first prong 510 and the second prong 512, when engaged with the rod portion, may extend at least partially around an outer circumference of the rod portion. As such, the second end 518 of the isolating mechanism 500 form an interference or snap-fit with the rod portion 418. This snap-fit may allow the isolating mechanism 500 to move (e.g., rotate about the y-axis), as the rod portion 418 moves, and without decoupling from the rod portion 418.

The isolating mechanism 500 includes a cavity 520 for engaging the rod portion. The cavity 520 may be defined, at least in part, by the first prong 510 and the second prong 512. Surfaces of the cavity 520 may be circular, straight, chamfered, etc. for engaging with the exterior surface of the rod portion. In some instances, the cavity 520 may include a height (Y-direction) that is sized larger than the cross-sectional dimension of the rod portion. The cavity 520 enables the first cylinder rod 114 or the second cylinder rod 116 to freely rotate axially.

In some instances, the isolating mechanism 500 may include a non-metallic material to prevent scratching, scuffing, scoring, and/or otherwise damaging the rod portion. The non-metallic material, by way of example, may include plastic, composites, polymers, etc. The non-metallic material may also serve as a bearing such that the isolating mechanism 500 may roll on the rod portion. The non-metallic material may also provide elasticity from debris within an environment of the machine 100, such as dirt, rocks, ice, etc.

Although the second end 518, or the first prong 510 and the second prong 512, are described as engaging the rod portion 418, in some instances, the isolating mechanism 500 may engage with the cylinder portion of the first cylinder rod 114 or the second cylinder rod 116. In such instances, the first prong 510 and the second prong 512 may be spaced apart accordingly, and the cavity 520 may be sized to receive the cylinder portion 416.

Figure 6:
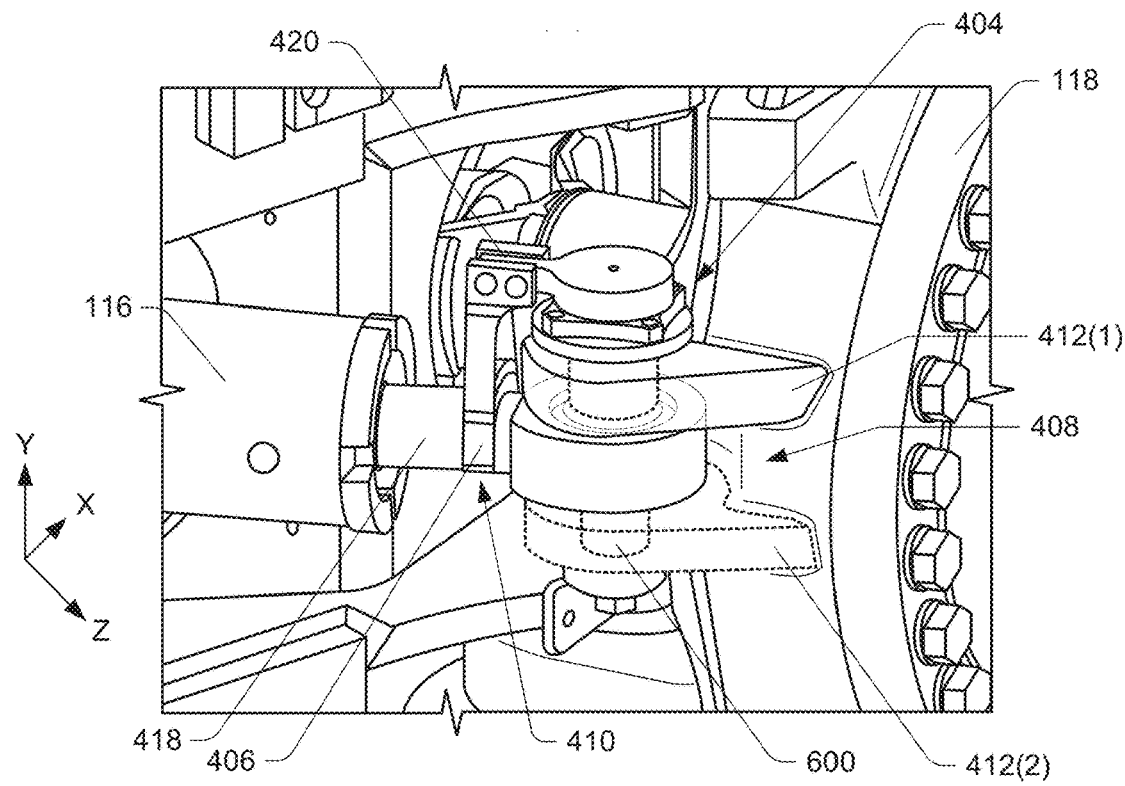
FIG. 6 illustrates a perspective view of the steering assembly of FIG. 1, with the isolating mechanism of FIG. 4, according to an embodiment of the present disclosure.

FIG. 6 illustrates a detailed view of the steering assembly 102, showing the second cylinder rod 116, the second sensor 404, and the second isolating mechanism 406. Introduced above, the second cylinder rod 116 includes the first end 408 that rotationally couples to the oscillating hitch 118 via a pin, such as a pin 600 (shown in dashed lines). The pin 600 may be disposed through a passage extending through the first end 408 of the second cylinder rod 116, the upper flange 412(1), and the lower flange 412(2). As shown, the upper flange 412(1) and the lower flange 412(2) are transparent for illustrating the pin 600 disposed therethrough.

The second isolating mechanism 406 couples to the arm 420, which in turn, couples to the second sensor 404 for sensing a rotational movement of the second cylinder rod 116. For example, as shown, the second end of the second isolating mechanism 406 may wrap around, or engage, at least a portion of the rod portion 418 of the second cylinder rod 116. The pin 600 may remain stationary within the oscillating hitch 118, such that the second sensor 404 may rotate about the pin 600. In the illustrated embodiment, the second sensor 404 may couple to an end 602 (e.g., the top of the pin 600). More specifically, FIG. 6 shows the second sensor 404 coupled to a plate secured to the end 602 of the pin 600.

The second sensor 404 is designed to measure the second steering angle 208 rotation and avoid interference of other angular degrees of freedom not related to the steering angle. The second end of the second isolating mechanism 406, which includes the fork design, permits the second cylinder rod 116 to roll about the second longitudinal axis 202 without influencing the desired steer angle. As the second cylinder rod 116 extends or retracts, the second sensor 404 measures the angle between the second longitudinal axis 202 the frame 104, or the steering axis 204. Given the interaction between the second isolating mechanism 406 and the second cylinder rod 116, the second isolating mechanism 406 may include a non-metallic material. Additionally, the non-metallic material may act as a bearing surface around the second cylinder rod 116, as well as to provide elasticity from impact of debris.

Figure 7:
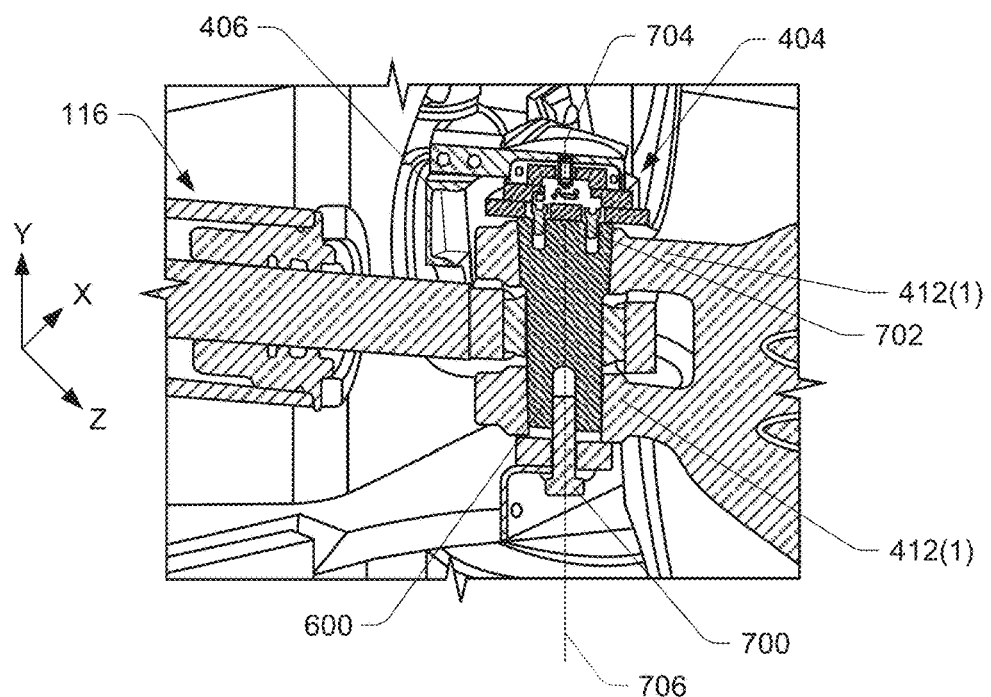
FIG. 7 illustrates a cross-sectional view of the steering assembly of FIG. 1, showing the isolating mechanism, according to an embodiment of the present disclosure.

FIG. 7 illustrates a cross-sectional view of the second isolating mechanism 406, the pin 600, and the second sensor 404. In some instances, the cross-sectional view as illustrated in FIG. 7 may be taken through a plane including the second longitudinal axis 202 of the second cylinder rod 116 and a longitudinal axis of the pin 600.

As shown, the pin 600 is disposed through the first end 408 of the second cylinder rod 116 (and the rod eye 414), the upper flange 412(1), and the lower flange 412(2). A fastener 700 may secure the pin 600 within, or to, the oscillating hitch 118. The second sensor 404 is shown coupled to a top of the pin 600 via one or more fasteners 702. The coupling of the second sensor 404 to the pin 600 allows for the second sensor 404 to remain stationary during a rotation of the second cylinder rod 116. More particularly, as shown, the second sensor 404 may include an outer housing 704 (e.g., disk, rotor, etc.) disposed vertically above the pin 600. The outer housing 704 may include the arm 420 that couples to the second isolating mechanism 406. As the outer housing 704 rotates, via a movement of the second isolating mechanism 406, a shaft coupled to the outer housing 704 may rotate. The movement of the shaft may be sensed by the second sensor 404 for determining the second steering angle 208.

The second isolating mechanism 406 may push down and snap around the second cylinder rod 116. Thereafter, the second isolating mechanism 406 may couple to the arm 420. The second end of the second isolating mechanism 406 is designed with a slight interference fit with the second cylinder rod 116 to avoid hysteresis. In some instances, a center of the second sensor 404 may be aligned with a center of rotation of the first end 408 of the second cylinder rod 116. For example, the second cylinder rod 116 may rotate about the center of rotation during a steering of the machine 100. In some instances, the center of rotation may be associated with a vertical axis 706 of the pin 600 that couples the second cylinder rod 116 to the oscillating hitch 118. In doing so, the second sensor 404 may measure the second steering angle 208. At this location, the second sensor 404 may detect a breakage or failure of the second cylinder rod 116 with measurement of the second steering angle 208.

The second sensor 404 may include a low-profile. In some instances, the second sensor 404 may measure or include a sufficient amount of angular rotation. By way of example, the second sensor 404 may measure 110 degrees of angular rotation. The second sensor 404 may include a steering resolution of 0.035 degrees of rotation per bit or better. This level of resolution may control haptic feedback without the operator experiencing undesired torque rippling or vibration input from the steering wheel or the joystick. Additionally, in some instances, the second sensor 404 may output a monotonic value that either represents whether the second steering angle 208 is increasing or decreasing with a stroke of the second cylinder rod 116.

Although the discussion herein relates to one side of the steering assembly 102, it is to be understood that the first cylinder rod 114, the first sensor 400, and the first isolating mechanism 402 may function similarly or include similar components as the second cylinder rod 116, the second sensor 404, and the second isolating mechanism 406, respectively.

Figure 8:
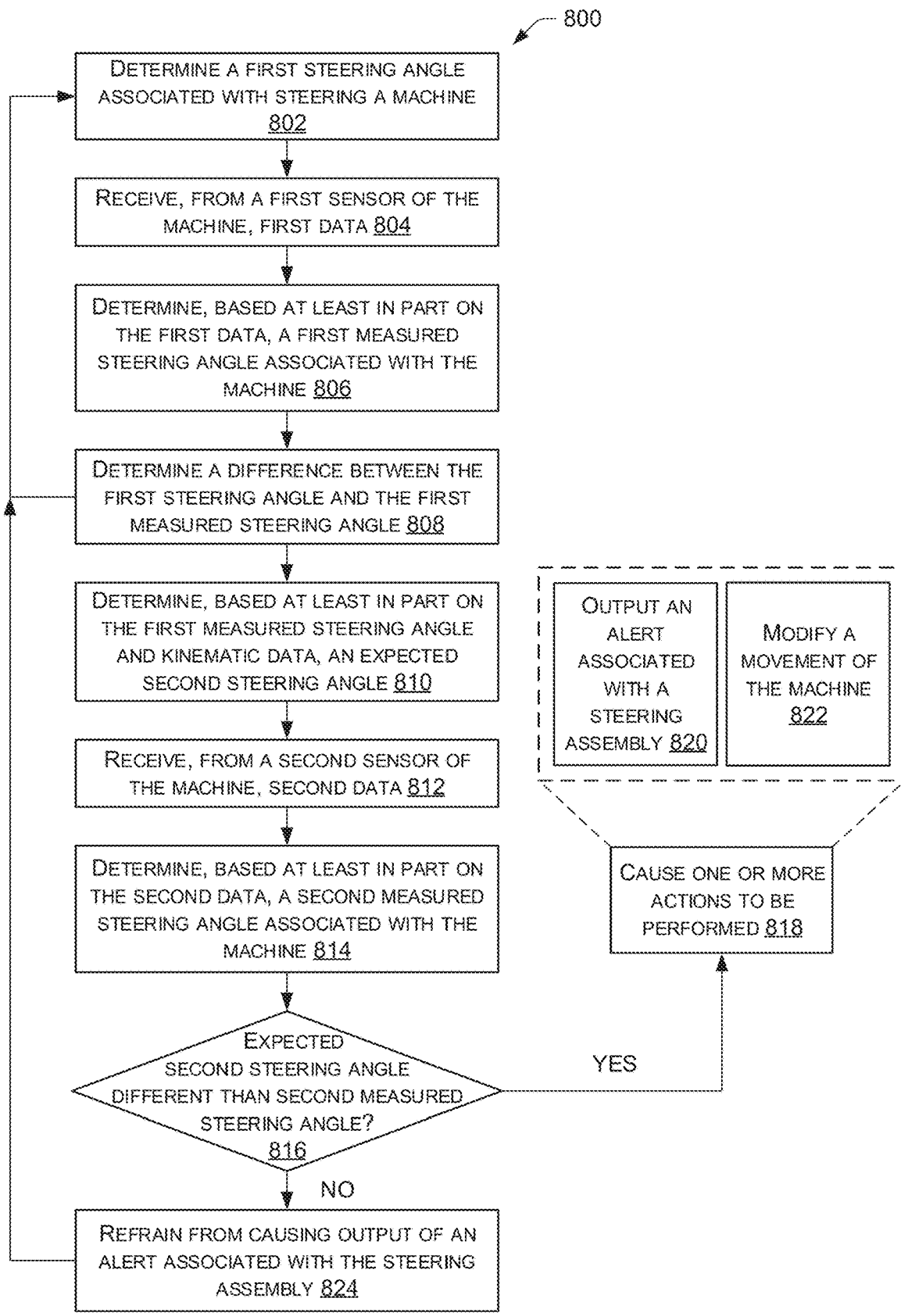
FIG. 8 illustrates an example process for determining steering angles of a machine for use in determining a failure of a steering assembly of the machine, according to an embodiment of the present disclosure.

FIG. 8 illustrate a process 800 for determining steering angles of the machine 100 for use in determining steering angles of the machine 100 and/or a failure of one of more components of the steering assembly 102. The process 800 described herein is illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process 800, or alternative processes, and not all of the blocks need be executed. For discussion purposes, the process 800 is described with reference to the environments, machines, architectures, and systems described in the examples herein, such as, for example those described with respect to FIGS. 1-7, although the process 800 may be implemented in a wide variety of other environments, machines, architectures, and systems.

In some instances, the process 800 may be performed by the machine 100 and/or the remote system 148. For example, the failure detection system 130 may be implemented at the remote system 148 for determining a failure of one of more components of the steering assembly 102

At 802, the failure detection controller 132 may determine a first steering angle associated with steering the machine. For example, in response to an operator steering the machine 100, command signals may be provided to actuators, controllers, etc. associated with extending and retracting the first cylinder rod 114 and the second cylinder rod 116, respectively. These command signals may also be associated with certain steering angles desired of the machine 100. For example, a first actuation of the first cylinder rod 114 may be associated with a first steering angle and a second actuation of the second cylinder rod 116 may be associated with a second steering angle. In some instances, a steering controller may receive inputs from an operator of the machine 100 and instruct the steering assembly 102 to steer by varying amounts.

At 804, the failure detection controller 132 may receive, from the first sensor 400, first data corresponding to the first steering angle 206 of the machine 100. In some instances, the first sensor 400 may be disposed on a first side of the machine 100 or may be associated with the first cylinder rod 114. The first sensor 400 may be arranged to measure a steering angle at a first side of the machine 100, such as a right hand side. In some instances, the first sensor 400 may correspond to an angle sensor that measures a rotational movement of the first cylinder rod 114.

At 806, the failure detection controller 132 may determine the first measured steering angle 206 of the machine 100, at the first side of the machine 100. In some instances, the first measured steering angle 206 may be measured between the first longitudinal axis 200 of the first cylinder rod 114 and the steering axis 204. For example, the first measured steering angle 206 may be measured to be 30 degrees.

At 808, the failure detection controller 132 may determine a difference between the first steering angle and the first measured steering angle 206. That is, a difference between the steering angles, as instructed and as measured, may be determined. In some instances, this difference may be used to monitor a health of the steering assembly 102 and/or for feedback loops. For example, from 808, the process 800 may loop to 802 for determining additional steering angles.

At 810, the failure detection controller 132 may determine, based at least in part on the first measured steering angle and kinematic data, an expected second steering angle. For example, the failure detection controller 132, using the first measured steering angle 206 and the kinematic data 140, may determine a predicted or expected steering angle associated with the second cylinder rod 116. In other words, in proper operation, throughout the range of steering, the first steering angles and the second steering angles may be associated with one another and certain steering angles may be expected. If the first measured steering angle 206 has a given angle, then if the steering assembly 102 is properly working (i.e., not broken), then the second steering angle 208 should have a known angle. If differences are determined, this may be indicative of the steering assembly 102 not functioning properly. The kinematic data 140 may indicate the expected second steering angle, based on a given input of the first measured steering angle 206.

At 812, the failure detection controller 132 may receive, from the second sensor 404, second data corresponding to a steering angle of the machine 100. In some instances, the second sensor 404 may be disposed on a second side of the machine 100 or may be associated with the second cylinder rod 116. The second sensor 404 may be arranged to measure a steering angle at a second side of the machine 100, such as a left hand side. In some instances, the second sensor 404 may correspond to an angle sensor that measures a rotational movement of an end of the second cylinder rod 116.

At 814, the failure detection controller 132 may determine the second measured steering angle 208 of the machine 100, at the second side of the machine 100. For example, based on the second data, the failure detection controller 132 may determine the second measured steering angle 208. In some instances, the second steering angle 208 may be measured between the second longitudinal axis 202 of the second cylinder rod 116 and the steering axis 204.

At 816, the failure detection controller 132 may determine whether the expected second steering angle is different than the second measured steering angle 208. For example, the failure detection controller 132 may compare the second steering angle 208 with the expected second steering angle, as determined at 814. For example, if the expected second steering angle and the second measured steering angle 208 are within a certain threshold, this may indicate that the steering assembly 102 is functioning properly. However, if the second expected steering angle and the second measured steering angle 208 are not within a certain threshold, this may indicate that the steering assembly 102 is not functioning properly. As such, a determination of whether the expected second steering angle and the second measured steering angle 208 are different than may include a comparison of the difference to a threshold. If the difference is greater than a threshold amount, the process 800 may follow the "YES" route and proceed to 818.

At 818, the failure detection controller 132 may cause one or more actions to be performed. For example, as a result of determining that the second measured steering angle 206 and the expected second steering angle are different, the failure detection controller 132 may cause one or more actions to be performed. The one or more actions may be associated with preventing damage to the steering assembly 102 and/or notifying the operator of the potentially failed steering assembly 102.

As shown at 818, sub-operations 820 and/or 822 may be performed. For example, at 814, the failure detection controller 132 may cause output an alert associated with a steering assembly. The failure detection controller 132 may communicate with the alert controller 142 for causing output of the alert 144. The alert 144 may be visual, tactile, audible, and/or any combination thereof. For example, the alert 144 may be output on a user interface of the machine 100, warning of the potentially failed components of the steering assembly 102. The alert 144 may therefore warn the operator as to the potentially failed steering assembly 102, which in turn, may cause the operator to power down the machine 100 to avoid further damage.

Additionally, or alternatively, at 822 the failure detection controller 132 may cause modification of a movement of the machine. For example, the failure detection controller 132 may communicate with the movement controller 146 for restraining or restricting a movement of the machine 100. For example, the movement controller 146 may apply brakes to stop a movement of the machine 100 and/or may power down an engine of the machine 100. The restraint provided by the movement controller 146 may prevent further damage to the machine 100 and/or the steering assembly 102.

Alternatively, if at 816 the difference is less than a threshold amount, the process 800 may follow the "NO" route and proceed to 824. At 824, the failure detection controller 132 may refrain from causing output of an alert associated with the steering assembly. For example, if the failure detection controller 132 determines that the difference between the second measured steering angle 208 and the expected second steering angle is less than the threshold difference, the failure detection controller 132 may determine that the steering assembly 102 is functioning properly. As a result, the failure detection controller 132 may refrain from alerting the operator and/or controlling movement of the machine 100. From 824, the process 800 may proceed to 802 whereby the failure detection controller 132 may receive additional sensor data for determining steering angles of the machine 100 and potential faults of the steering assembly 102.

Although the process 800 describes certain scenarios in which actions are performed in the event of a failure, the actions may be performed by additional operations. For example, if the sensors 134 report steering angles that are erratic or include intermittent behavior, the sensors 134 may be faulty. This may indicate that the sensors 134 and/or the steering assembly 102 has failed. Additionally, if signals from the sensors 134 are not received by the fault detection controller, or a constant output is received, this may indicate that the sensors 134 and/or the steering assembly 102 has failed. Additionally, although the process 800 illustrates comparison of the second measured steering angle 208 with that of an expected second steering angle, the process 800 may repeat for comparing the first measured steering angle 206 with that of an expected first steering angle.

In instances where the process 800 is performed by the remote system 148, or the remote system 148 determines the failure of the steering assembly 102, the remote system 148 may communicate with the machine 100 for instructing or otherwise controlling the machine 100. In other words, the machine 100 may be remotely controlled by the remote system 148 (or other system or device). In such instances, the remote system 148 may transmit signals to the machine 100 for performing various operations, such as raising and lowering the dump box 108, steering, accelerating the machine 100, and so forth. As it pertains to the instant application, the remote system 148 may transmit signals associated with braking the machine 100 or restraining a movement of the machine 100 in instances where the steering assembly 102 fails. Moreover, the remote system 148 may transmit the alerts to other third-parties associated with the failed steering assembly 102. As such, the remote system 148 may communicatively couple to the machine 100 for receiving sensor data 136 and making determinations as to the health of the steering assembly 102.

INDUSTRIAL APPLICABILITY

The present disclosure describes use of steering angle sensor systems for steering control and determining failures, or more generally, a health of a steering assembly of a machine 100, such as mining machines (e.g., a mining truck). The machines 100 may be controlled locally (e.g., onboard operator) and/or remotely (e.g., remote operator). Determining the failure of the steering assembly provides several advantages, such as reducing repair time, costs, and/or additional damage being imparted to the machine 100.

The systems and methods disclosed herein allow for determining the health of the steering assembly on a continual basis by comparing steering angles of the machine 100. For example, sensor(s) may be disposed on or about the steering assembly, external to the cylinder rods. However, the sensor(s) (e.g., angle sensors) may operably couple to an end of the cylinder rods, for example, for determining the steering angles. Locating the sensor(s) external to the cylinder rods reduces repair time and cost, as well as a cost of manufacturing. For example, in instances where the sensors malfunction or break, requiring replacement, solely replacing the sensor, as compared to the cylinder rods, may be more cost effective. Moreover, the sensor(s) may include components that isolate unwanted vertical and/or rotational movements. For example, the sensor(s) may isolate vertical movements or roll movements of the cylinder rods imparted by a suspension system of the machine 100. By isolating these movements, the sensors may accurately measure the steering angles of the machine 100 for use in detecting faults.

Although the systems and methods of the machines 100 are discussed in the context of a mining truck, it should be appreciated that the systems and methods discussed herein may be applied to a wide array of machines and vehicles across a wide variety of industries, such as construction, mining, farming, transportation, military, combinations thereof, or the like. For example, the system or methods discussed herein may be implemented within any vehicle, machine, or equipment with wheels, such as a combine.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

The invention claimed is:

1. A machine, comprising:
a frame;
an oscillating hitch configured to pivot relative to the frame;
a first cylinder coupled to a first side of the oscillating hitch and a first side of the frame;
a second cylinder coupled to a second side of the oscillating hitch and a second side of the frame;
a first isolating mechanism coupled to the first cylinder and configured to rotate in response to a first rotation of the first cylinder relative to at least one of the frame or the oscillating hitch, the first isolating mechanism including first prongs that engage an exterior surface of the first cylinder to couple the first isolating mechanism to the first cylinder;
a first angle sensor configured to sense a first angular displacement of the first isolating mechanism about a first rotational axis;
a second isolating mechanism coupled to the second cylinder and configured to rotate in response to a second rotation of the second cylinder relative to at least one of the frame or the oscillating hitch, the second isolating mechanism including second prongs that engage an exterior surface of the second cylinder to couple the second isolating mechanism to the second cylinder; and a second angle sensor configured to sense a second angular displacement of the second isolating mechanism about a second rotational axis.

2. The machine of claim 1, wherein:
the first isolating mechanism is configured to isolate rotational motion of the first cylinder about the first rotational axis from other motions of the first cylinder; and
the second isolating mechanism is configured to isolate rotational motion of the second cylinder about the second rotational axis from other motions of the second cylinder.

3. The machine of claim 2, wherein:
the first rotational axis is a first axis of rotation of the first cylinder relative to the first side of the oscillating hitch; and
the second rotational axis is a second axis of rotation of the second cylinder relative to the second side of the oscillating hitch.

4. The machine of claim 1, wherein:
the first cylinder is free to rotate relative to the first prongs about a first longitudinal axis of the first cylinder; and
the second cylinder is free to rotate relative to the second prongs about a second longitudinal axis of the second cylinder.

5. The machine of claim 1, wherein at least one of:
the first angle sensor senses the first angular displacement to within about 0.035 degrees rotation per bit degrees rotation per bit; and
the second angle sensor senses the second angular displacement to within about 0.035 degrees rotation per bit.

6. The machine of claim 1, further comprising:
one or more processors; and
one or more non-transitory computer-readable media storing instructions that, when executed by the one or more processors, cause the one or more processors to perform operations comprising:
receiving, from the first angle sensor, first data corresponding to the first angular displacement;
receiving kinematic data associated with a kinematic relationship between the first cylinder and the second cylinder;
determining, based at least in part on the first angular displacement and the kinematic data, an expected second angle;
receiving, from the second angle sensor, second data corresponding to the second angular displacement;
determining a difference between the second angular displacement and the expected second angle; and
determining, based at least in part on the difference to a threshold difference, whether the first cylinder or the second cylinder is functioning properly.

7. The machine of claim 6, the operations further comprising at least one of:
causing output of an alert associated with a failure of at least one of the first cylinder or the second cylinder; or
restricting a movement of the machine based at least in part on determining that the difference is greater than the threshold difference.

8. The machine of claim 1, wherein:
the first cylinder extends along a first longitudinal axis;
the second cylinder extends along a second longitudinal axis;
a steering axis extends through a first point associated with a coupling of the first cylinder to the oscillating hitch and a second point associated with a coupling of the second cylinder to the oscillating hitch;

the first angular displacement is measured between the first longitudinal axis and the steering axis; and the second angular displacement is measured between the second longitudinal axis and the steering axis.

9. A machine, comprising:

a hitch;

a steering assembly including:
   a first hydraulic actuator; and
   a second hydraulic actuator;

a first isolating mechanism coupled to the first hydraulic actuator and configured to rotate in response to a first rotation of the first hydraulic actuator, the first isolating mechanism including first protrusions that engage at least a portion of an exterior surface of the first hydraulic actuator;

a first sensor configured to sense a first angular displacement of the first isolating mechanism about a first rotational axis;

a second isolating mechanism coupled to the second hydraulic actuator and configured to rotate in response to a second rotation of the second hydraulic actuator, the second isolating mechanism including second protrusions that engage at least a portion of an exterior surface of the second hydraulic actuator; and a second sensor configured to sense a second angular displacement of the second isolating mechanism about a second rotational axis.

10. The machine of claim 9, wherein:

surfaces of the first protrusions contacting the exterior surface of the first hydraulic actuator comprise a non-metallic material; and surfaces of the second protrusions contacting the exterior surface of the second hydraulic actuator comprise a non-metallic material.

11. The machine of claim 9, wherein:

the first isolating mechanism is configured to isolate rotational motion of the first hydraulic actuator about the first rotational axis from other motions of the first hydraulic actuator; and the second isolating mechanism is configured to isolate rotational motion of the second hydraulic actuator about the second rotational axis from other motions of the second hydraulic actuator.

12. The machine of claim 9, further comprising:

one or more processors; and one or more non-transitory computer-readable media storing instructions that, when executed by the one or more processors, cause the one or more processors to perform acts comprising:
   receiving, from the first sensor, first data corresponding to a first angle associated with the first hydraulic actuator;
   receiving, from the second sensor, second data corresponding to a second angle associated with the second hydraulic actuator;
   determining an expected second angle based at least in part on the first angle; and
   determining, based at least in part on a difference between the expected second angle and the second angle, whether the steering assembly is functioning properly.

13. The machine of claim 9, wherein:

a steering axis extends through a first point at which the first hydraulic actuator couples to the hitch and a second point at which the second hydraulic actuator couples to the hitch;

the first sensor is configured to measure a first angle between a first longitudinal axis of the first hydraulic actuator and the steering axis; and the second sensor is configured to measure a second angle between a second longitudinal axis of the second hydraulic actuator and the steering axis.

14. The machine of claim 9, wherein:

the first isolating mechanism couples to the first sensor via a first arm coupled to the first sensor;

the first isolating mechanism is configured to rotate relative a first longitudinal axis of the first hydraulic actuator;

the second isolating mechanism couples to the second sensor via a second arm coupled to the second sensor; and the second isolating mechanism is configured to rotate relative a second longitudinal axis of the second hydraulic actuator.

15. A machine comprising:

a frame;

an oscillating hitch configured to pivot relative to the frame;

a first cylinder extending between the oscillating hitch and the frame, the first cylinder being coupled to the frame to pivot relative to the frame about a first axis;

a second cylinder extending between the oscillating hitch and the frame, the second cylinder being coupled to the frame to pivot relative to the frame about a second axis;

a first isolating mechanism contacting an outer surface of the first cylinder and configured to isolate first rotation of the first cylinder about the first axis from movements other than the first rotation of the first cylinder;

a first angle sensor configured to sense a first angular displacement of the first isolating mechanism about the first axis;

a second isolating mechanism contacting an outer surface of the second cylinder and configured to isolate second rotation of the second cylinder about the second axis from movements other than the second rotation of the second cylinder,
   wherein at least one of the first isolating mechanism or the second isolating mechanism comprises a first prong and a second prong spaced from the first prong, inner surfaces of the first prong and the second prong contacting opposing portions of the outer surface of a respective at least one of the first cylinder or the second cylinder; and a second angle sensor configured to sense a second angular displacement of the second isolating mechanism about the second axis.

16. The machine of claim 15, wherein the inner surfaces form a snap fit with the outer surface of the respective at least one of the first cylinder or the second cylinder.

17. The machine of claim 16, wherein at least a portion of the inner surfaces comprises a non-metallic material.

* * * * *